United States Patent [19]
Liu et al.

[11] Patent Number: 5,489,400
[45] Date of Patent: Feb. 6, 1996

[54] MOLECULAR COMPLEX OF CONDUCTIVE POLYMER AND POLYELECTROLYTE; AND A PROCESS OF PRODUCING SAME

[75] Inventors: Jia M. Liu, Hsinchu, Taiwan; Linfeng Sun; Sze C. Yang, both of Kingston, R.I.

[73] Assignee: Industrial Technology Research Institute, Taiwan

[21] Appl. No.: 235,182

[22] Filed: Apr. 28, 1994

Related U.S. Application Data

[63] Continuation of Ser. No. 872,289, Apr. 22, 1993, abandoned.
[51] Int. Cl.$^6$ ........................................ H01B 1/00
[52] U.S. Cl. .................... 252/500; 528/373; 528/378; 528/391; 528/422; 528/487
[58] Field of Search ........................ 252/500, 518; 528/422, 391, 487, 373, 378

[56] References Cited

U.S. PATENT DOCUMENTS

| | | | |
|---|---|---|---|
| 4,933,106 | 6/1990 | Sakai et al. | 252/500 |
| 4,940,517 | 7/1990 | Wei | 204/78 |
| 4,959,180 | 9/1990 | Armes et al. | 252/519 |
| 4,983,322 | 1/1991 | Elsenbaumer | 252/500 |
| 5,068,060 | 11/1991 | Jen et al. | 252/500 |
| 5,370,825 | 12/1994 | Angelopoulos et al. | 252/500 |

FOREIGN PATENT DOCUMENTS 2124635  2/1984  United Kingdom.

OTHER PUBLICATIONS

J. Chem. Soc., Chem. Commun., 1991, pp. 1529–1532, "Novel Colloidal Polyaniline Fibrils Made By Template Guided Chemical Polymerization Nov".
J. Electroanal. Chem., 1987, pp. 229–235, "The Mechanism Of Eletrodeposiiton Of Composite Polymers Including Polypyrrole" vol. 227.
J. Electroanal. Chem., pp. 123–135, "Charge–Controllable Polypyrrole/Polyelectrolyte Composite Membranes" vol. 224 (1987).
J. Electroanal. Chem., 1989, pp. 147–164, "Electrochemically Controlled Binding And Release Of Protonated Dimethyldopamine And Other Citations From Poly(N–Methyl–Pyrrole)Polyaniline Composite Redox Polymers" vol. 261.
J. Electrochem. Soc., 1986, pp. 310–315, "Electronically Conductive Composite Polymer Membrane" vol. 133.
J. Phys. Chem., 1986, pp. 4447–4451, "Electrochemical Incorporation Of Poly(pyrrole) Into Nafion And Comparison Of The Electrochemical Properties of Nafion–Poly(pyrrole) Electrodes" vol. 90.
J. Electrochem. Soc., 1988, pp. 1132–1137, "Electrochemical Behaviors Of Polypyrrole, Poly–3-methylthiophene, And Polyaniline Deposited On Nafion–coated Films" vol. 135.
Chemistry Letters, 1992, pp. 1787–1790, "Electroactivity Change Of Electropolymerized Polypyrrole/Polystyrenesulfonate Composite Film in SOme Organic Electrolytes".
J. Polymer Science:Polymer Chemistry Edition, 1985, pp. 1687–1698, "An Electrically Conductive Plastic Derived From Polypyrrole and Poly(Vinyl Chloride)" vol. 23.
Electroanal. Chem., 1988, pp. 71–82, "Virtures of Composite Strucutres In Electrode Modification: Preparation and Properties Of Poly(Aniline)/Nafion Composite Films" vol. 257.
Reactive Polymers, 1992, pp. 197–206, "Morphology and Growth Rate of Polyaniline Films Modifed By Surfactants And Polyelectrolyes" vol. 17.
Mat. Res. Soc. Symp. Proc., 1992, pp. 601–606, "Novel Template Guided Synthesis Of Polyaniline" vol. 247 Jan.
Polymer Reprints, 1992, pp. 378–380, "Template Guided Synthesis Of Conducting Polymers—Molecular Complex Of Polyaniline And Polyelectrolyte" vol. 33, No. 2, Aug. 1992.
MRL Bull. Res. Dev., 1992, pp. 1–6, "Novel Colloidal Polyaniline Fibrils: (1) The Morphology Study" May.
MRL Bull. Res. Dev., 1992, pp. 7–12, "Novel Colloidal Polyaniline Fibrils: (11) The Electronic Absorption Spectra Study In Aqueous Solution" May.
Am. Rev. Phys. Chem., 1982, pp. 191–223, "Polyelectrolyte Theories And Their Applications To DNA vol. 33".

*Primary Examiner*—Paul Lieberman
*Assistant Examiner*—M. Kopec

*Attorney, Agent, or Firm*—Samuels, Gauthier & Stevens

[57] ABSTRACT

A processable, electrically conductive polymer composition comprises a molecular complex made by template guided chemical polymerization and having a polyelectrolyte and a conductive polymer. A process of preparing a processable, electrically conductive polymer composition comprises the steps of oxidative polymerizing the monomers (abbreviated as AN) for a conductive polymer in the presence of a polyelectrolyte which serves first as a template (abbreviated as TEMP) that binds AN to form a template-(AN)n complex; and adding an oxidant to the template-(AN)n complex for conducting an oxidative polymerization to obtain a molecular complex of a polyelectrolyte and a conductive polymer.

13 Claims, 14 Drawing Sheets

MOLECULAR COMPLEX OF CONDUCTIVE POLYMER AND POLYELECTROLYTE; AND A PROCESS OF PRODUCING SAME

This is a continuation of application Ser. No. 07/872,289, filed on Apr. 22, 1992, now abandoned.

This invention relates to the composition of, and the template guided chemical polymerization for the molecular complexes consisting conductive polymers and polyelectrolyte. The molecular complexes have good optical properties, special morphology, good conductivity, and advantageous for processing.

BACKGROUND OF THE INVENTION

Conductive polymer has been studied in recent years for its novel electrical and optical properties [R. B. Kaner and A. G. MacDiarmid, *Scientific America*, 258, 106 (1988)]. Because of its electrical conductivity, it can be used as conductive paints, as electrical connection in flexible electrical circuit boards, as electromagnetic shielding, and as anti-electrostatic coatings. Its optical property leads to potential application as light filters, as thin film light polarizer, as color variable paints, and as nonlinear optical materials. In addition, conducting polymer is an electroactive material that can be reversibly doped and undoped by electrochemical oxidation and reduction. This property leads to possible applications as rechargeable batteries, electrochromic display devices and electrochromic windows.

Common methods for synthesis of conducting polymers lead to intractable materials that are usually not amenable to industrial processing. For example, polyaniline in its conductive form is insoluble in solvents, so it is difficult to be solution-processed. Upon heating, polyaniline decomposes before melting, so it can not be melt-processed. Other conducting polymers also have similar problems of the lack of processability, and this has limited the practical application of conductive polymers.

Most conductive polymers are insoluble in its doped conductive form. Some conductive polymers can be made slightly soluble by converting into its de-doped insulator form. For example, undoped polyaniline has low solbility in N-methylpyrrolidinone and 80% acetic acid [Angelopoulos et al, *Mol. Cryst. Liq. Cryst.*, vol. 160, p. 151–163 (1988).]. Articles formed from this solution is not electrically conductive and lacks certain desirable optical properties associated with conductive polymers. Re-doping of the solid is difficult and is likely to cause cracking of films due to the insertion of dopant molecules into dense solid.

A method has been devised to make solutions of polyaniline in its conductive form. Elsenbaumer [U.S. Pat. Nos. 4,983,322 and 5,006,278] used a certain organic polar solvent coupled with specific oxidative dopant to dissolve the undoped base form of polyaniline (emeraldine base). The procedure comprises synthesizing conductive polymer in aqueous acidic medium, treated with base, dried, and then redissolve with nitromethane solution of ferric chloride. The multi-step procedure is somewhat cumbersome and the dissolving process is slow. An additional disadvantage is that articles made from this prior procedure may be dedoped because the low molecular weight dopants are relatively easy to escape from the host polymer due to heat (evaporation) or due to dissolving into organic solvent or water.

In order to bind the dopants more strongly to keep the conductive polymer in the conductive form and at the same time provide solubility, there have been efforts to functionalize polyaniline with sulfonic group containing substituents. For example, a sulfonated polyaniline such as poly(aniline sulfonic acid) is soluble in strong acidic and basic aqueous solutions because the sulfonate group is solvated by water molecules [J. Yue, S. H. Wang, K. R. Cromack, A. J. Epstein, and A. G. MacDiarmid, *J.Am.Chem.Soc.*, 113, 2665 (1991)]. Alternatively, long alkyl chain, or alkyl sulfonic chain can be covalently bonded to the aromatic rings of polyaniline to render solubility in either organic solvents or aqueous solvents [L. H. Dao, M. Leclerc, J. Guay and J. W. Chevalier, *Synth. Metals*, 29, E377 (1989)]. Unfortunately, the covalently bonded side chains invariably affect the electrical and optical properties of polyaniline because of disturbances on the electronic structure arising from the strong electronic effect of the sulfonic group or due to the steric hindrance imposed by a bulky substituent which twists the relatively planar structure of the un-substituted polyaniline and decreases the pi electronic conjugation.

An alternative method involves the formation of colloidal particles of conductive polymers (polypyrrole and polyaniline). In this method a steric stabilizer is chemically grafted onto the backbone of polypyrrole or polyaniline [S. P. Armes and B. Vincent, *J. Chem. Soc., Chem. Commun.* p. 288, (1987); S. P. Armes, J. F. Miller and B. Vincent, *J. Coll. Interface Sci.*, 118, 410 (1987); *J. Chem. Soc., Chem. Commun.* 88 (1989); Armes et al, U.S. Pat. No. 4,959,180 and 4,959,126.] Since the steric stabilizer uses protonated vinylpyridine units to help stabilizing the colloid in the suspension, the colloid flocculates in base solution. The colloidal particles are suitable for casting thin films but may not have sufficient fibrous morphology to allow for stretch or melt processing.

In a previous study of electrochromic device [Yang et al, U.S. patent application Ser. No. 373,195] an electrochemical synthesis method was used to make electrochromic polyaniline with desirable color-switching responses. The electrochromic material was made by electrolysis of a solution of polyelectrolyte and monomeric aniline [Hwang et al, *Synthetic Metals*, 29, E271–E276 (1989); Zhang et al, *Synthetic Metals*, 29, E251–E256 (1989), Zhang et al, *MRS Symposium Proceedings*, (1990); Hyodo et al, *Electrochemical Acta*, 36, 87–91 (1991)]. Such material is a solid containing the conducting polymer and the polyelectrolyte. The material made by electrochemical polymerization is insoluble in water and other organic solvents, therefore it is difficult to be used in solution processing. The electrochemical polymerization is not easy to develop the large scale production.

It is an object of this invention to provide a processable, electrically conductive polymer composition containing a molecular complex made by template-guided chemical polymerization.

It is a further object of this invention is to provide a template-guided chemical polymerization process for preparing molecular complex.

The present invention uses chemical polymerization to form molecular complex of polyelectrolyte and conducting polymer which is versatile for processing. The synthetic method is suitable for mass production and can be controlled to provide the desirable different properties of the molecular complex. We disclose here the synthetic method and the new materials of different processability:

(1) Aqueous and non-aqueous solutions of the conductive polymer complex that are useful for spraying or casting thin films of conductive polymer.

(2) Colloidal suspension of the conductive polymer complex that are advantageous for coating, painting, printing or for compounding.

(3) Solid state of the conducting polymer complexes that are advantageous for stretch, melt processing, or for compounding.

SUMMARY OF THE INVENTION

The present invention discloses a new processable material and a new process for making the same. These new processable materials are a family of molecular complex between a polyelectrolyte and a conductive polymer. The present molecular complex is made by template guided chemical polymerization and contains a polyelectrolyte and a conductive polymer. The polyelectrolyte carries a net negative electrical charge and the conductive polymer carries a net positive electrical charge or the polyelectrolyte carries a net positive electrical charge and the conductive polymer carries a net negative electrical charge. Alternatively, the polyelectrolyte carries a net negative electrical charge and the conductive polymer is in its non-conductive, electrically neutral state. Optionally, the present polyelectrolyte carries a net positive electrical charge and said conductive polymer in its nonconductive electrically neutral state. In addition, the molecular complex of this invention can comprise two types of polyelectrolyte and one type of conducting polymer.

The polyelectrolyte suitable used in this invention is selected from polymers with anionic functional group such as carboxylic acid or sulfonic acid group or its salt form, as for example: poly(styrene sulfonic acid) or its salt form, poly(acrylic acid) or its salt form, poly(2-acrylamido-2-methyl-1-propenesulfonic acid) or its salt form, poly(butadiene-maleic acid) or its salt form, and poly(methacrylic acid) and copolymers thereof. The present conducting polymer is selected from the following polymers, such as, polyaniline, polypyrrole, polythiophene, poly(phenylene sulfide), poly(p-phenylene), poly(phenylene vinylene), poly(furylene vinylene), poly(carbazole), poly(thienylene vinylene), polyacetylene, poly(isothianaphthene) or the substituted versions thereof. Preferrably, the molecular complex is composed of poly(acrylic acid), poly(styrenesulfonic acid), and polyaniline, or poly(styrenesulfonic acid) and polyaniline, or poly(2-acrylamido-2-methyl-1-propenesulfonic acid) and polyaniline, or poly(acrylic acid) and polyaniline, or poly(butadiene-maleic acid) and polyaniline, or poly(styrenesulfonic acid) and polypyrrole, or poly-(acrylic acid), poly(2-acrylamido-2-methyl-1-propenesulfonic acid) and polyaniline, or poly(butadiene-maleic acid), poly(styrenesulfonic acid) and polyaniline.

The new process involves using a template-guided chemical polymerization which can be controlled to provide the desirable different properties of the molecular complex. The present process of preparing a processable electrically conductive polymer composition comprises oxidative polymerizing the monomers (abbreviated as AN) for a conductive polymer in the presence of a polyelectrolyte which serves first as a template (abbreviated as TEMP) that binds AN to form a template-(AN)n complex, which upon oxidative polymerization by an oxidant results in a molecular complex of a polyelectrolyte and a conductive polymer. This process is called the template guided chemical polymerization. Before the step of adding the oxidant to the template-(AN)n complex, the template polyelectrolyte is dissolved in aqueous or nonaqueous solutions to facilitate binding of AN to the template. The oxidant used for the polymerization of AN is selected from the group consisting of sodium persulfate, hydrogen peroxide, ferric chloride, sodium periodate, benzoyl peroxide, oxygen, sodium chlorate, sodium perchlorate, bromine, chlorine and the like. Perferrably, the oxidant used in this invention is mixture of hydrogen peroxide and ferric chloride. In the above-mentioned process, the monomer of the conductive polymer could be replaced with a dimer, an oligomer, or a mixture thereof. The solution used in this invention is selected from the groups consisting of water, acetone, methyl ethyl ketone, acetic acid, methanol, ethanol, n-propanol, isopropyl alcohol and other alcohols, tetrahydrofuran, dimethylformamide, N-methylpyrrolidinone, dimethylsulfoxide, and other polar solvents, and the mixture thereof.

The molecular weight of the polyelectrolyte used in this invention is controlled to result in solution, colloidal suspension or solid of the polyelectrolyte-(conducting polymer) complex or to synthesize viscous gel or solid fibrous material that can be stretch processed to form optically or electrically anisotropic fibers or films. The mole ratio of AN to the monomeric unit of polyelectrolyte could be controlled to result in solution, colloidal suspension or solid of the polyelectrolyte-(conducting polymer) complex. The solution or the colloid of the polyelectrolyte-(conducting polymer) complex can form a conductive polymer film by casting or spin coating process. The purification of the present molecular complex for removing free polyelectrolyte molecules from the reaction mixture was achieved by using solvent extraction including liquid-liquid extraction and liquid-solid extraction. The solvent used for purification the molecular complex is selected form the groups consisting of isopropyl alcohol, n-butanol, n-pentanol, n-hexanol and other alcohols, acetone, methyl ethyl ketone and the like.

The new materials made by the template guided chemical polymerization process have good optical properties, special morphology, good conductivity, and advantageous for processing.

MOLECULAR COMPLEX

A discussion of the reasons for conducting polymer to be intractable is helpful for understanding why the molecular complex of the present invention can own the variable and multiple processability. Here, we use polyaniline as an example though the phenomenon and the principle are generally applicable for other conducting polymers.

In acidic medium, polyaniline has positive charges on its molecular backbone. These charges come from either protonation at the nitrogen atom sites or polarons in its n-electronic system [A. G. MacDiarmid, J. C. Chiang, A. F. Richter, A. J. Epstein, *Synth. Metal*, 18, 285 (1987); P. M. McManus, S. C. Yang and R. J. Cushman, *J. C. S. Chem. Soc., Chem. Commun.*, 1556 (1985); P. M. McManus, R. J. Cushman, S. C. Yang, *J. Phys. Chem.* 91, 744 (1987); R. J. Cushman, P. M. McManus and S. C. Yang, *J. Electroanl. Chem.* 291, 335 (1986); A. G. MacDiarmid, A. J. Epstein, *Faraday Discuss. Chem. Soc.*, 88, 317 (1989)]. Although polyaniline, due to its positive charges, is a polycation, yet its physical properties are quite different from the classical polyelectrolytes. For example, the classical polycation, poly(vinylbenzyltrimethylammonium chloride), is soluble in water but polyaniline molecules (and other conducting polymers too) tends to aggregate into intractable solid. Conducting polymers aggregate into intractable solid because they have stiff molecular backbone due to extended pi conjugation and there are strong short range inter-molecular attractive forces between π clouds of adjacent polyaniline chains. In addition, the doped conductive polymers also has long range attractive force between the charged polymer backbone and the dopants. These interchain attractive forces make the conductive polymer difficult to be dissolved or melted for processing.

It was mentioned previously in the background section that although solubility can be obtained by attaching substituent to polyaniline backbone it inadvertently disturb the pi electronic system of the conducting polymer. These problem arises from the fact that the substituents are covalently bonded to the conductive polymer, therefore the strong perturbation on the electronic structure and the molecular conformation degraded the electrical and optical properties of the chemically substituted polyaniline. Similar effect were observed in other conductive polymers with only a few exceptions.

In the present invention, we use polyelectrolytes to form molecular complex with conducting polymer to render solubility to the conducting polymer but impose minimal interference to the pi electronic system of the conducting polymer. A simplified schematic representation in FIG. 1 illustrates this point. A segment of a single conducting polymer chain is represented by a curved line in the figure. When the ionic functional group $X^-$ (for example, $X=SO_3$) is covalently bonded to the backbone of the conductive polymer for solubility problem (FIG. 1-a) [MacDiarmid etc., *J.Am.Chem.Soc.*, 113, 2665 (1991); L. H. Dao etc., *Synth. Metals*, 29, E377 (1989)], the pi electronic system of the conductive polymer is disturbed. The formation of molecular complex (FIG. 1-b) leads to a soluble complex but exerts negligible disturbance to the pi electronic system of the conducting polymer because of the absence of the strongly disturbing covalent bonds seen in the chemically substituted conductive polymer.

An additional advantage of these molecular complex based material is the versatility. This advantage arises from the fact that the choice of the two components can be varied to fine-tune material property. Both the polyelectrolyte part and the conductive polymer part can be selected from a large pool of candidate materials to adjust material property. As illustrative examples, We disclose here the synthetic method and the molecular complexes of different processability:

(1) Aqueous and non-aqueous solutions of the conductive polymer complexes that are useful for spraying or casting thin films of conductive polymer.

(2) Colloidal suspension of the conductive polymer complexes that are advantageous for coating, painting, printing or for compounding.

(3) Solid state of the conducting polymer complexes that are advantageous for stretch, melt processing, or for compounding.

SYNTHETIC PROCESS: TEMPLATE-GUIDED CHEMICAL POLYMERIZATION OF CONDUCTING POLYMER COMPLEXES

The new processable materials mentioned in the previous section are synthesized by the "template-guided chemical polymerization".

FIG. 2 illustrates the general concept of template-guided synthesis of conducting polymers complexes. The molecular template (TEMP, as thick lines in FIG. 1) binds the aniline monomers (AN or $H^+AN$) to form TEMP-(AN)n molecular complexes. The template molecules used in this study are polyelectrolyte with anionic function groups. The attractive force between AN and TEMP can be either: (1) a site specific binding (for example, ligand force, hydrogen bonding, other short-range forces), or (2) a "territorial binding" [G. S. Manning, *J. Chem. Phys.* 51, 924 (1969), and 89, 3772 (1988).] for which the monomers are confined within a cylindrical volume close to the template molecule. According to Manning's theory of counterion condensation, under appropriate conditions, the counterions (in this case, $H.AN^+$) in the electrolyte solution are "condensed" into this cylindrical volume so that $H.AN^+$ monomers are "territorially bounded". The conformation and the shape (eg. coil, rod, folded or extended chains) of the TEMP-(AN)n complex is determined by the electrostatic, hydrophobic and other interactions between AN and TEMP. Therefore, different TEMP molecules may result in complexes of different conformation and shape. Even for a chosen TEMP molecule, the reaction condition for forming TEMP-(AN)n complex may also provides different TEMP-(PAN) with different properties. In the above sentence, PAN represents polyaniline.

It is important to use a solution medium that can effectively expose the binding sites of the polymer TEMP. A solution medium that favors an extended chain conformation will lead to more exposed binding site, and thus higher degree of loading of AN onto TEMP to form TEMP-(AN)n complex. So, the well exposed binding sites to bind the An monomer is the key point to provide homogeneous species of the TEMP-(An)n complex in the reaction medium, then polymerized to result in the molecular complex TEMP-PAN with uniform shape and properties. Because of the ability to vary the choice of template and the variability for forming TEMP-(AN)n complex, the template guided chemical polymerization method can be used to make material of a wide range of processability.

The TEMP-(An)n complex mentioned above is a homogeneous species, so the small fibrils in the following example of polyacrylic acid-polyaniline (PAA-PAN) complex result in uniform the shape. The morphology of molecular complex of the PAA with M.W.=250,000 and that made by the two phase method in the following example are quite the same owing to those made from the homogeneous TEMP-(An)n complex, thus also indicate the molecular complexes made by the template guided chemical polymerization are different from the previous electrochemical polymerization [Hwang et al, *Synthetic Metals*, 29, E271–E276 (1989); Zhang et al, *Synthetic Metals*, 29, E251–E256 (1989), Zhang et al, *MRS Symposium Proceedings*, (1990); Hyodo et al, *Electrochemical Acta*, 36, 87–91 (1991)]. The material made by the electrochemical polymerization is a solid containing the conducting polymer and polyelectrolyte, and the elemental analysis shows the rich in the PAN ratio. This indicates the monomer An is more mobile than the higher M.W. polyelectrolyte to arrive the surface of the electrode to be polymerized. Therefore, the processes of electrochemical polymerization are essentially quite different from those of the template guided chemical polymerization with homogeneous TEMP-(An)n complex, and the molecular complexes made by them are also quite different.

Upon polymerization, the monomers AN are covalently bonded to neighboring AN to form polyaniline (PAN) and stay attached with the template to form TEMP-PAN complex. From molecular modeling, one sees that TEMP and PAN molecules twist together in a molecular complex of TEMP-PAN. At least, part of the attractive force between $TEMP^{n-}$ and $PAN^{m+}$ is electrostatic in origin. As one readily learns from molecular biologists, other forces such as hydrogen-bonding, van der Waals attraction or hydrophobic interactions may also play roles of varied importance for different TEMP molecules.

Depending on the preparations to be illustrated in the following sections, the TEMP-PAN complex is either water-soluble, or stable colloidal suspensions, or solids with controlled and uniform morphology. Since the shape of TEMP-(AN)n complex depends on the choice of the TEMP molecules, the morphology of the product will also be dependent on the choice of the template molecules.

A protonated aniline, the anilinium ion, has a positive charge at one end of the molecule and a hydrophobic aromatic function group at the other end. The attractive force between TEMP and AN could be either ionic binding, territorial electrostatic binding, hydrogen bonding, Van del Waals attraction, or hydrophobic interactions. The schematics in FIG. 2 illustrates only some of the possible modes of binding. The relative importance of the different binding forces varies as the choice of TEMP is changed. This offers opportunity for adjusting the polymer morphology and other properties of the complex. Once the polymerization is completed to form TEMP-PAN complex, the attractive force between TEMP and PAN may or may not be the same as that between TEMP and AN.

One interesting experimental fact about the complex TEMP-PAN is that the ionic bonding does not account for all the binding force between TEMP and PAN. The discussion following Example 1 provide evidence that other binding forces exist because the complex does not dissociate even if PAN is converted to the basic, electrically neutral state. This shows that the concept of template-guided chemical polymerization is not restrictive to ionic TEMP and ionic PAN. Electrically neutral polymers can be used as the components.

In the above description, aniline monomer is used as a specific example to illustrate the principle. The concept can easily be generalized to a case where AN is a building block of other conductive polymers. As long as the building block is sufficiently attracted to the template molecule and the template-(building block) complex can be polymerized into a polymeric complex.

An example in the formation of TEMP-(polypyrrole) complex is useful for illustrating how the concept of template-guided chemical polymerization can be generalized without much effort. Pyrrole does not have as strong a basic site as aniline, therefore it is harder to use protonated pyrrole monomer to cause ionic or hydrogen bonding attraction between TEMP and pyrrole. However, as a solution of monomeric pyrrole is oxidized, oligomeric pyrrole is formed as an intermediate before completion of polymerization. By adjusting the rate of polymerization and the choice of solvent, a reasonable steady state concentration of the oligomer (pryyole)m is present in the reaction solution. Since (pyrrole)m has a lower ionization potential (oxidation potential) than pyrrole monomer, it can exist as stable (albeit transient) cation in solution. This offers an ionic building block (pyrrole)$_m^+$ without the need for a protonation site at the monomer pyrrole. This oligomeric building block offers electrostatic binding in addition to the van der Waals and hydrophobic interactions with the template molecule, so it is easier to form TEMP-((pyrrole))n complex. Subsequent polymerization leads to the formation of TEMP-(polypyrrole) complex.

The above mentioned strategy has general applicability to other conducting polymers such as polythiophene, poly(p-phenylene), poly(phenylene vinylene), etc. In general most of the conductive polymers are polycations in its conductive form (p-doped). This indicates that the polycations are chemically stable enough to exist in ambient environment. The stability comes from the fact that the radicals (polarons) or the dications (bipolarons) are resonantly stabilized due to the extended pi orbital conjugation. It is reasonable to obtain an oligomeric cation that has sufficient chemical stability so that the oligomeric cation will have stability half life in the order of hours or days. Such oligomeric cations can be used to bind to a template and to complete the chemical polymerization before its chemical decay.

The template guided chemical polymerization is not restrictive to the formation of complex of single strands of the component polymers in 1:1 ratio. Other mixing ratios and multiple types of each component can be made and may have desirable special properties.

BRIEF DESCRIPTIONN OF THE DRAWINGS

The present invention can be more fully understood by a reading to the subsequent detailed description of the preferred embodiments with references made to the accompanying figures, wherein.

Figure 12:
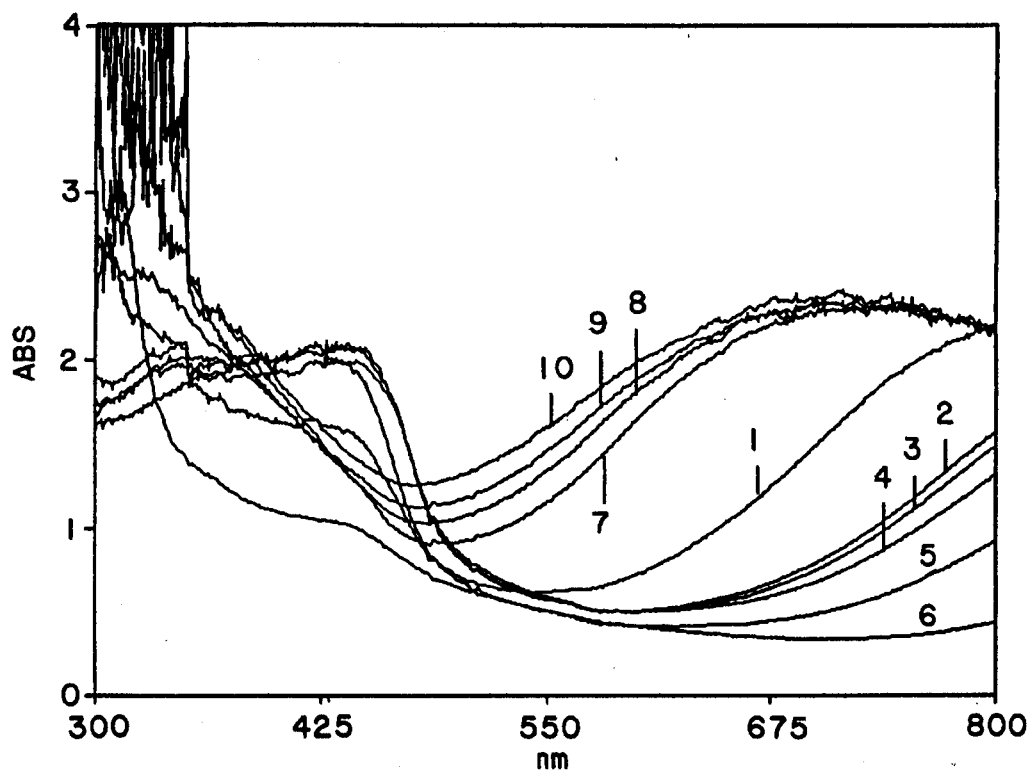
Figure 13:
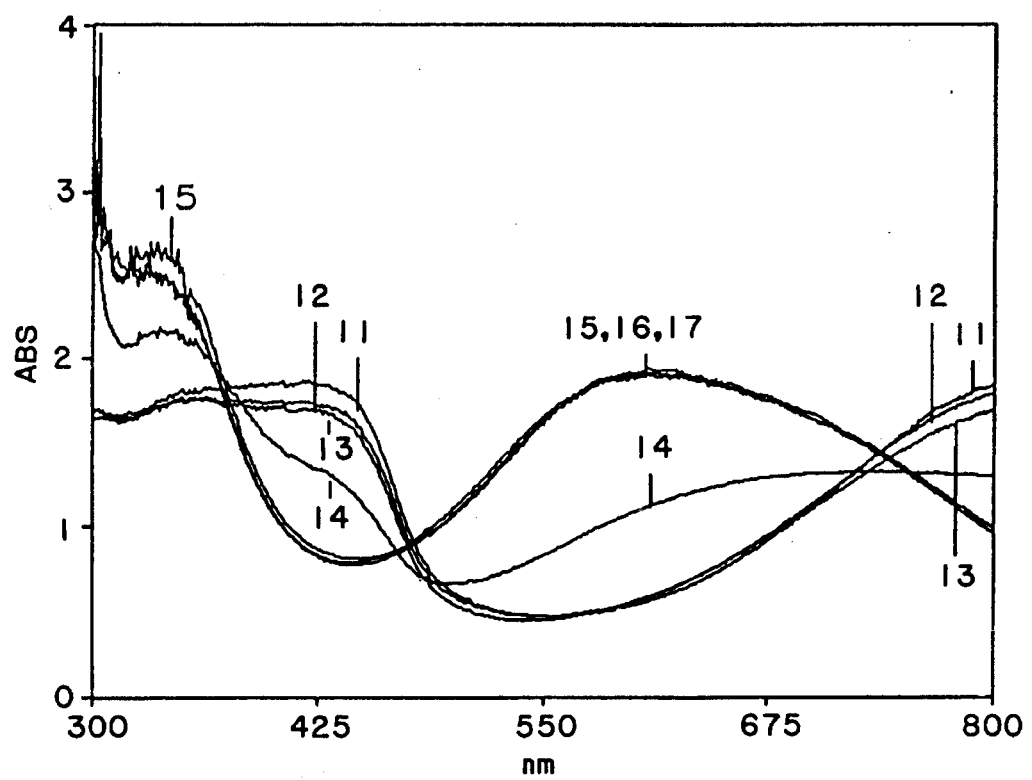
Figure 14:
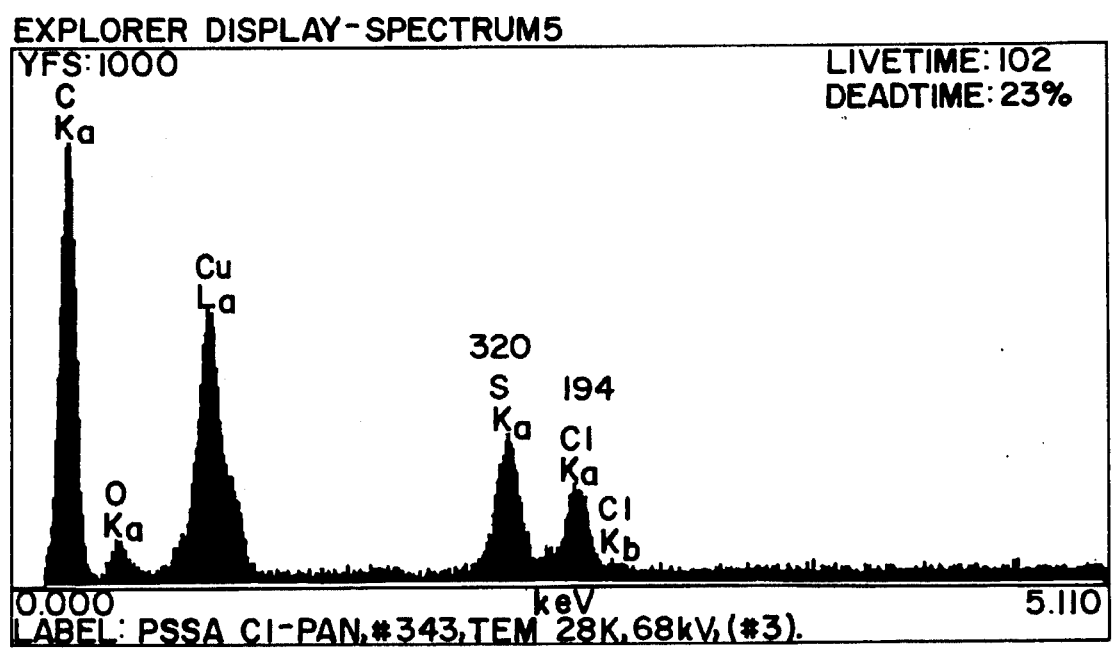
Figure 15:
Figure 16:
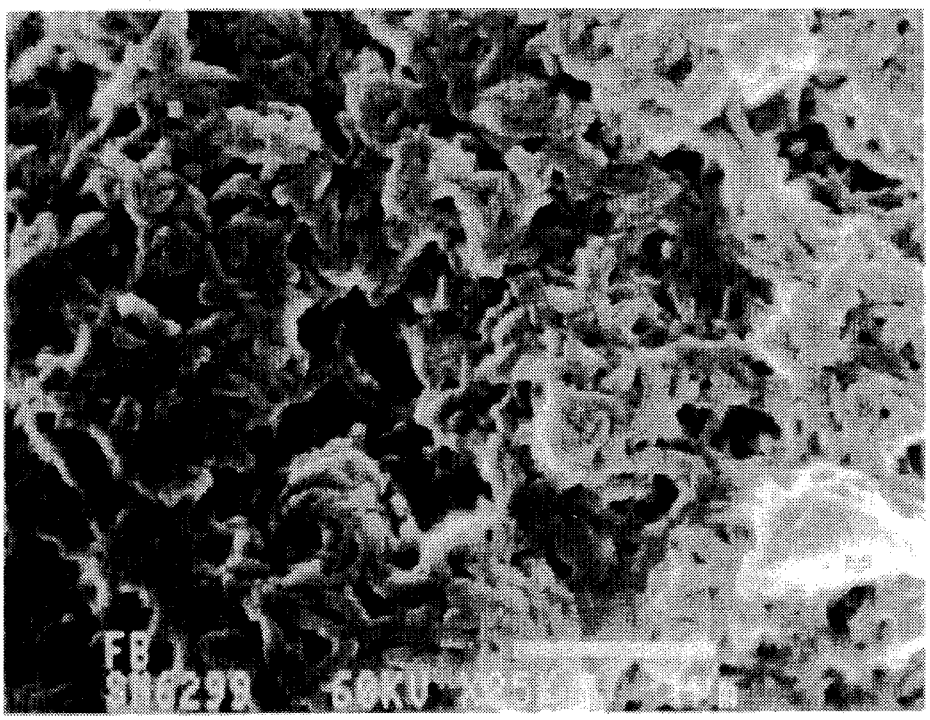
Figure 17:

FIG. 12 is a graphical representation showing the electron absorption spectra obtained during titration of the colloidal polyaniline with reductant and oxidant spectra 2–4 (0.1 mol dm$^{-3}$ SnCl$_2$), spectra 5–6 (2 mol dm$^{-3}$ SnCl$_2$), spectra 7–10 [0.1 mol dm$^{-3}$ Ce(NH$_4$)$_2$ (SO$_4$)$_3$], conditions are given in Table 2;

FIG. 13 is a graphical representation showing the electronic absorption spectra obtained during titration of the colloidal polyaniline with 0.1 mol dm$^{-3}$ NaOH, conditions are given in Table 2;

FIG. 14 is X-ray microanalysis of PSSA-(Cl-PAN);

FIG. 15 is a SEM picture of fibrous PAA-PAN;

FIG. 16 is a SEM picture of fibrous PAA-PAN synthesized with PAA (M.W.=250,000); and FIG. 17 is a TEM picture of fibrous PAA-PAN synthesized with PAA (M.W.=750,000).

DETAILED DESCRIPTION

Soluble Molecular Complexes

Example 1A

Synthesis of PSSA-PAN complex with 2:1 monomer mole ratio between PSSA-PAN

To synthesize the PSSA-PAN polymer complex, 4.05 ml of aniline monomer ($44.4 \times 10^{-3}$ mole, from Aldrich, redistilled) is added into 30 gm of 30% poly(styrene-sulfonic acid) aqueous solution (containing $48.6 \times 10^{-3}$ mole of styrene-sulfonate monomer units, Polysciences, M.W.=70,000). After the solution was stirred for 1 hour, 30 ml of 3 M ferric chloride ($90 \times 10^{-3}$ mole) was added into the homogenous solution. The reaction mixture soon became green-colored. While stirring, 80 ml of 0.5M HCl and 1 ml of 30% hydrogen peroxide were added. After allowing time for the above reaction mixture to come to equilibrium, additional amount (4 ml) of hydrogen peroxide was slowly added into the reaction mixture in successive portions. The total amount of hydrogen peroxide was $44.1 \times 10^{-3}$ mole. After vigorous stirring, the reaction mixture was poured through a filter paper to remove small amount of particles. The filtrate is a dark green homogenous aqueous solution. The PSSA-PAN complex was isolated from the solution by a purification procedure and was analyzed by elemental analysis to be a molecular complex between poly(styrene sulfonic acid) and polyaniline. The mole ratio was found to be about 2:1 between the monomers of PSSA and PAN.

Example 1B

Synthesis of PSSA-PAN complex with 20:1 monomer mole ratio between PSSA-PAN

In this synthesis, 4.05 ml of aniline ($44.43 \times 10^{-3}$ mole) was added into 30 gm of 30% poly(styrene-sulfonic acid) ($48.64 \times 10^{-3}$ moles of monomer units) aqueous solution. After the solution) was stirred for ½ hour, 2 ml of 0.1M ferric chloride ($2 \times 10^{-4}$ mole) and 1 ml of 30% hydrogen peroxide ($8.8 \times 10^{-3}$ mole) were added into the solution while stirring is continued. A homogeneous green colored solution was formed. The reaction product do not contain any solid polyaniline particles because the solution passed through a dilter (Millipore, 1.2 μm pore size) without leaving any solid residue on the membrane.

Properties of PSSA-PAN Molecular Complex

The dry powder of the complex obtained in Example 1A and 1B readily redissolves in water, methanol and DMSO. For samples prepared in the ratio of reagents descrived here, the PSSA-PAN complex is a true solution. The green solution filters through millipore filters with pore size of 0.2 μm, and does not precipita te from water or methanol solutions under ultracentrifuge at $1.6 \times 10^5$ g acceleration. The specific gravity of the solvent used for ultra-centrifuge was varied between 0.997 to 0.79 by mixing water with methanol.

The solutions of PSSA-PAN can be casted onto surfaces of a variety of materials and evaporation dried to form thin films of PSSA-PAN complex. The film has all the optical properties attributable to polyaniline. The film in its green-colored state is an electrical conductor. The electrical conductivity is dependent on the degree of loading of PAN in PSSA. Typical specific resistivity of a 50% PAN loaded PSSA-PAN complex is 1 to 10 ohm $cm^{-1}$. Thus the material can be used for optical and electronic applications. The advantage of using the water and solvent soluble complex is that it is munc easier to be processed into large-area thin films when compared with polyaniline synthesized by conventional methods.

In the above description one can see that the solubility property of PSSA-PAN is in sharp contrast to that of PAN synthesiz ed by conventional method. The dried powder of PSSA-PAN can be re-dissolved and re-dispersed while the conventional PAN is intractable.

The purified and dried powder of PSSA-PAN has another property that is quite different from the uncomplexed PAN powder. When both PSSA-PAN and PAN samples are heated, the former appears to undergo a glass transition at about 270° C. while PAN decomposes without showing any sign of softening or melting. Another interesting point is that PSSA-PAN is much harder than PAN to be de-doped by either heating or water extraction of the protons. In addition to being useful for materials processing, these phenomena offers further prove that PSSA-PAN is a molecular complex and is not just a blend of particulate materials of PSSA and PAN.

Figure 3:
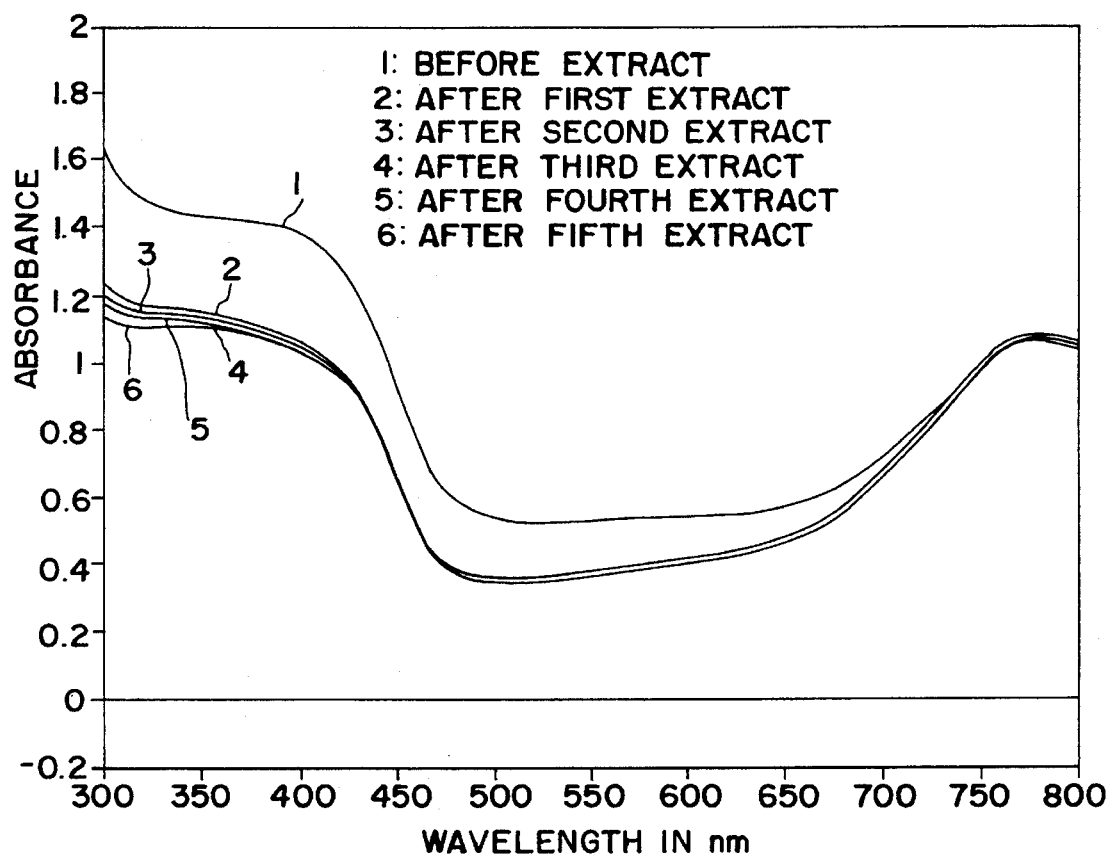
FIG. 3 is a graphical representation showing visible spectra of PSSA-PAN complex before and after extraction.
Figure 4:
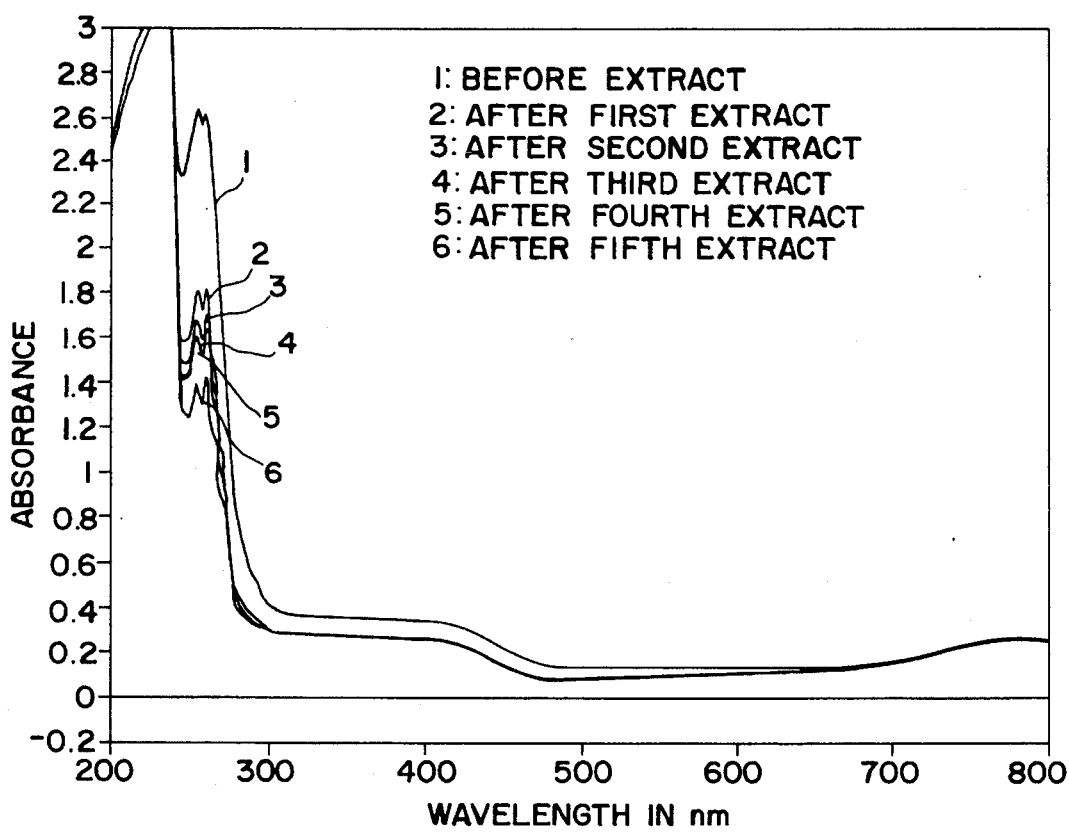
FIG. 4 is a graphical representation showing UV-visible spectra of PSSA-PAN complex before and after extraction.

The typical optical absorption spectra of aqueous solution of PSSA-PAN complex are shown as in FIGS. 3 and 4. FIG. 3 shows that PAN is in its green, conductive form which has optical absorption transitions at 760 and 420 nm associated with the charge carriers (polarons) for the conductor. The spectra for a more diluted solution at this point is shown in FIG. 4 which has strong ultraviolet absorption bands at 230 and 262 nm which matches the known pi-pi* transitions for PAN and PSSA respectively.

The solution can be chemically doped or undoped by oxidant, acid, reductant, or base to go through the normal sequence of color changes between transparent, green, blue and purple colors. The doping and undoping cycles are reversible and do not induce precipitation of the molecular complex. The optical absorption spectra in the UV-Vis region is substantially the same as those reported for thin films [P. M. McManus, R. J. Cushman and S. C. Yang, *J. Phys. Chem.*, 91, 744 (1987); R. J. Cushman, P. M. McManus and S. C. Yang, *J. Electroanal. Chem.*, 291, 335 (1986)]. This indicates that the water-soluble polyaniline has essentially the same electronic structure as films previously reported. The solution appears to be chemically and physically stable as it is doped and undoped to various color forms (or oxidation and protonation states). This indicates that the soluble molecular complex stay bounded together in either the protonated or deprotonated polyaniline forms. This fact suggests that the electrostatic attraction is not the only force that holds the complex together and there may be other interactions (perhaps short range forces) that also help binding the components of the complex. Since the polyaniline backbone is expected to have no charge in its deprotonated, blue colored insulator form, the electrostatic attraction would be absent in such state of PSSA-PAN complex.

Purification and the Composition of PSSA-PAN Complex

It was mentioned that one of the consequences of the template-guided chemical synthesis is that the product has the composition of molecular complex TEMP-PAN. This composition was verified by the elemental analyses result to be presented in this section.

Although the fact that the polyaniline-containing material is soluble in water provides favorable argument that the material is different from that synthesized by the prior art, the proof of the elemental composition of PSSA-PAN will considerably strengthen the case. Before an elemental analysis for this purpose is performed it is necessary to show that the sample is not a physical mixture of PSSA and TEMP. Such assurance was achieved by applying an array of exhaustive separation techniques to the sample synthesized in Examples 1A and 1B. The array of "purification" processes were designed to remove not only the un-(or "free") materials but also remove weakly bounded species. The progress of each purification process was carefully monitored to be sure that the "free" species were identified and were completely removed.

The elemental analyses of such "purified" samples revealed that the chemical composition is that for a PSSA-PAN complex. This section describes the details of the "purification" and the analysis of samples prepared by Examples 1A and 1B. Such exhaustive purification process may not be necessary for practical applications, but it was performed for the purpose of understanding the properties and to provide support that the product was PSSA-PAN complex.

This sub-section describes the experiments to obtain pure PSSA-PAN complex for the purpose of performing reliable chemical and physical analysis on the sample.

The solutions obtained in Example 1A and 1B may contain free PSSA, aniline oligomer and low molecular weight electrolytes and inorganic ions. There appears to little or no un-complexed PAN because it is insoluble particles and should be removed when the solutions pass through filters. In order to be certain that the elemental analysis (to be presented in the next section) is performed on samples free of the above mentioned impurities, we perform a purification that involves ion exchange to remove inorganic ions, specially for iron ions, solvent extraction to remove PSSA and low molecular weight organic compound, and dialysis to remove low molecular weight electrolytes and inorganic ions.

Removal of Cationic Impurities

Figure 7:
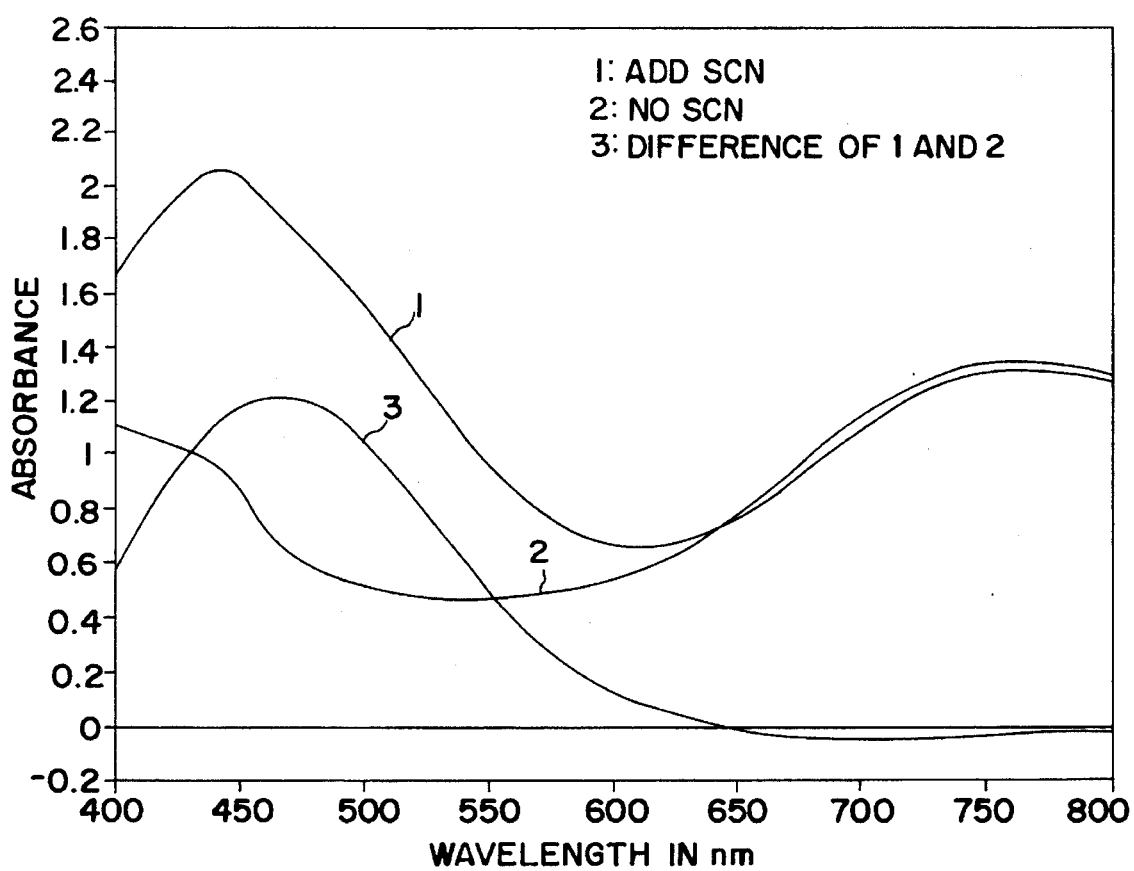
FIG. 7 is a graphical representation showing the visible spectra of PSSA-PAN complex before ion exchange.
Figure 8:
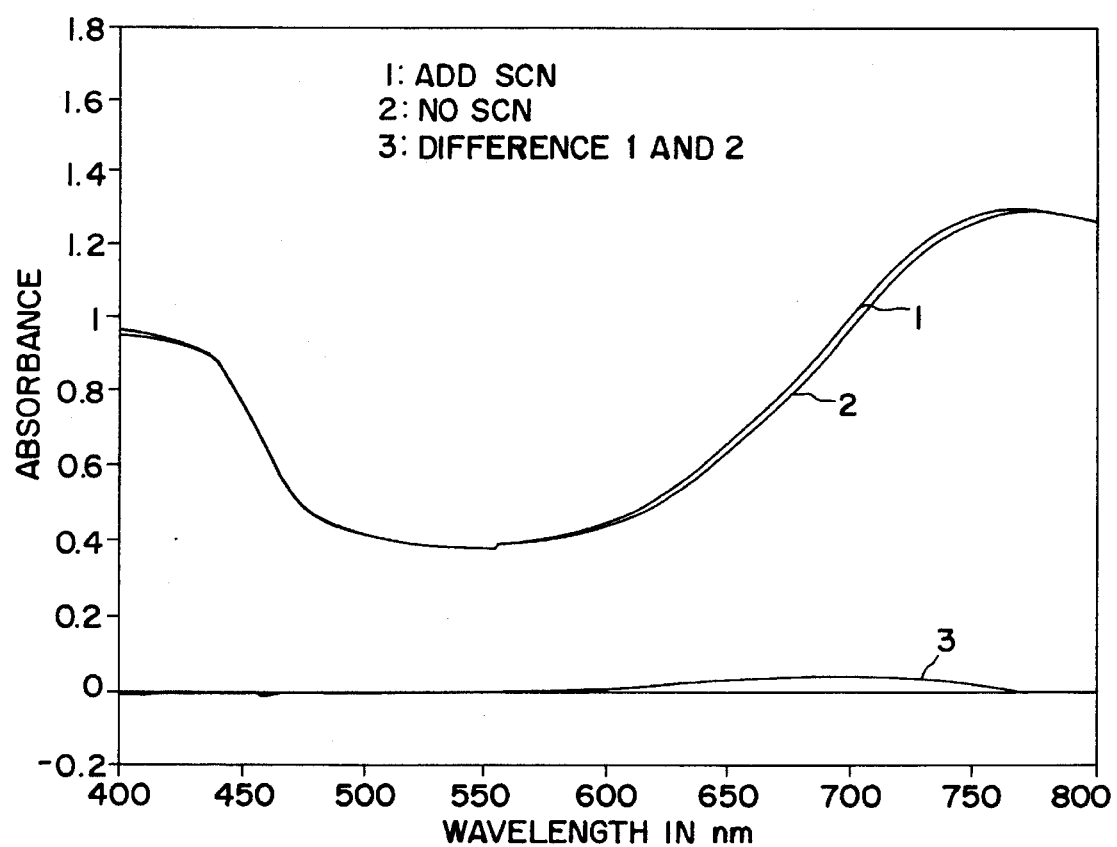
FIG. 8 is a graphical representation showing the visible spectra of PSSA-PAN complex after ion exchange.

Ferric and ferrous ions were removed by passing through a column of cationic ion exchange resin (IR-120 H C.P. AMBERLITE). The effectiveness for this procedure for removing ferric ions was monitored photometrically by complexing with SCN—. FIG. 7 shows the evidence for the presence of ferric ions in the reaction product of Example 1A. Samples of the reaction mixture (the green solution of Example 1A before purification) were monitored spectroscopically before and after the solution was passed through the ion exchanger. Before ion exchange the sample has an absorption spectrum shown as curve 2. By adding excess amount of NaSCN the spectrum changes to curve 2 which contains the superimposed spectra of ferric thiocyanate and PSSA-PAN complex. Curve #3 is the difference spectrum obtained by digitally subtracting curve 2 from curve 1, and it is a characteristic spectrum of ferric thiocyanate with an absorption band at 470 nm. After the green-colored solution was eluted through the ion exchange column, the same set of spectra were measured and the nearly flat curve 3 of FIG. 8 shows that there is no detectable free ferric ions in the solution. However, some of the ferric ions (less than 5%) may be bound to the PSSA molecules as revealed from the amount of ash found in the elemental analysis.

Since the solution was acidic, any "free" unreacted aniline (not bounded to PSSA) will be in the protonated form. These anilinium ions were also separated from that of the PSSA-PAN complex. Any free aniline not completely removed at this step will be removed in the subsequent steps to be described in the following sections.

Removal of Free PSSA

Free PSSA is extracted by 1-pentanol based on the fact that 1-pentanol can dissolve PSSA but not PSSA-PAN complex. After ion exchange purification, the dark green solution obtained in Example 1A was poured into a separatory funnel with equivalent volume of 1-pentanol and was vigorously shaken before letting the solution to separate into the pentanol-rich and the water-rich layers. The pentanol-rich layer does not show any green color of PAN indicating that PSSA-PAN complex is indeed quite insoluble in 1-pentanol. (The first extract show yellow tint due to impurity from the starting material of PSSA). The optical absorption spectra of the pentanol containing extract is shown as curve #1 of FIG. 5. It can be seen that the solution contains mainly PSSA because the 262 nm band of PSSA aromatic ring absorption is dominant. It should also be noted that the 760, 420 and 230 nm transitions of PAN seen in FIG. 3 and 4 are absent in FIG. 5. This verifies that 1-pentanol indeed preferentially extract PSSA but not PSSA-PAN. With this knowledge, we can be assured that using repeated extraction all the un-complexed PSSA will be removed from the sample.

The extraction cycle was repeated to be sure that all the free PSSA was removed from the sample. After the water-rich layer of the solution containing the complex is separated from the first portion of the 1-pentanol extraction solution, a fresh portion of 1-pentanol was used for a second extraction. Optical absorption spectra for the solutions separated from this second extraction process were measured to monitor the efficiency for separation. The PSSA absorption band in curve #2 of FIG. 5 is about ⅓ of curve #1 indicating that about ⅔ of the free PSSA was removed in one cycle of extraction.

Figure 5:
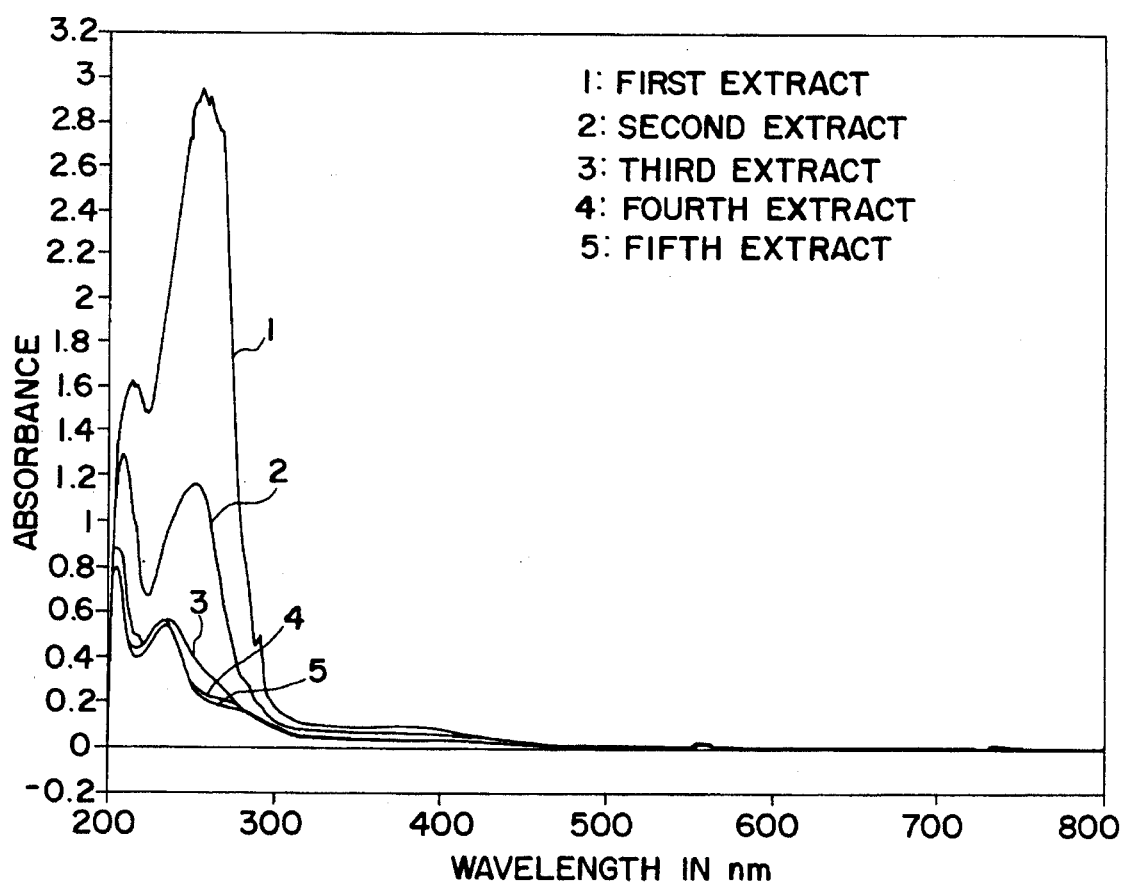
FIG. 5 is a graphical representation showing UV-visible spectra off 1-pentaanol extraction solution from PSSA-PAN complex.
Figure 6:
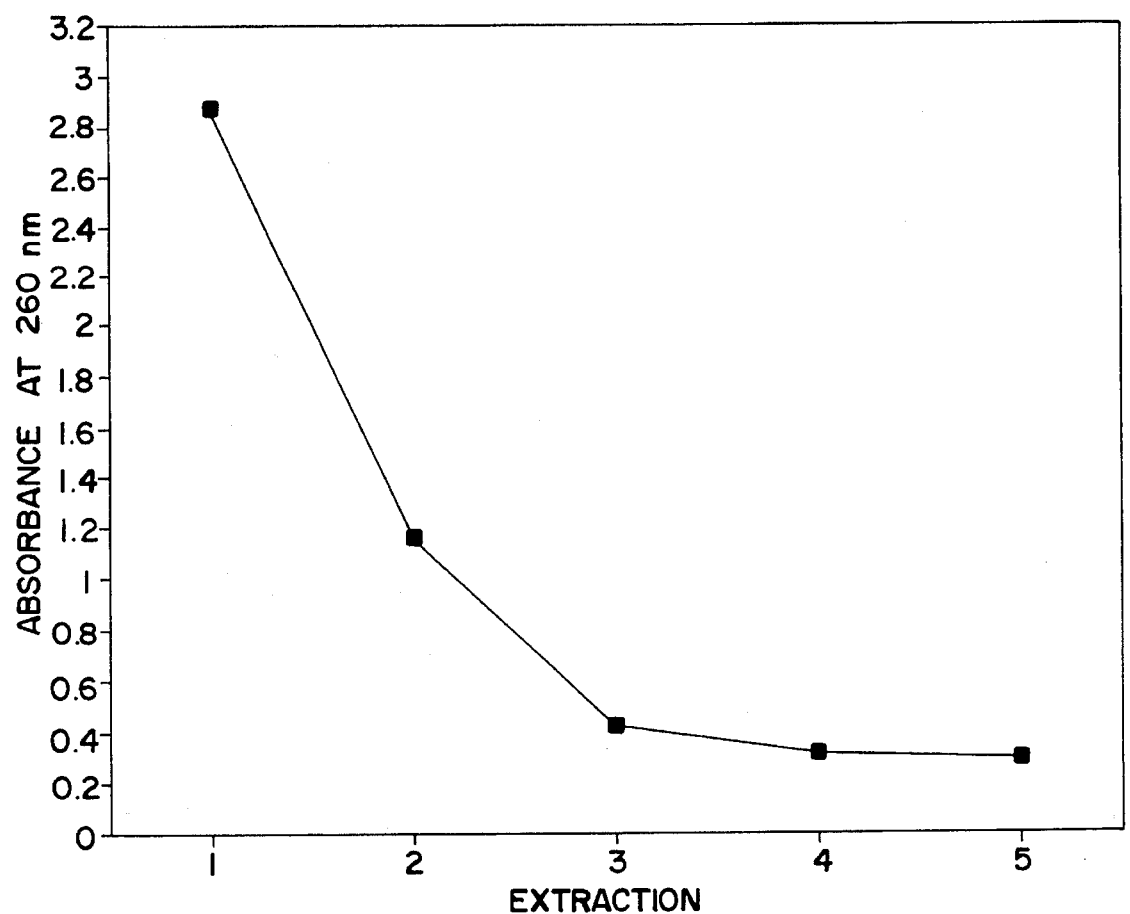
FIG. 6 is a graphical representation showing the decrease of PSSA in 1-pentanol extraction.

This extraction process was repeated for five extractions and the spectra of the solutions were monitored and are shown in FIGS. 3, 4 and 5. In FIGS. 4 and 5 the absorption due to the 262 nm band of free PSSA is negligible. There is a small amount of absorption at 262 nm mainly due to the absorption of aniline (which has absorption bands at 240 and 280 nm) extracted by 1-pentanol. The removal of this residual amount of aniline is to be discussed in the next section. FIG. 6 shows the decreasing absorbance of the 262 nm band of PSSA as the extraction is repeated. Taking into account of the residual aniline, it can be deduced that essentially all the extractable PSSA was removed from the sample.

In some experiments the amount of PSSA in the 1-pentanol extract was determined by acid-base titration and the result is in quantitative agreement with the spectroscopic measurement presented in the previous paragraphs.

The PSSA-free sample was then subjected to repeated dialysis with a dialysis tube (SPECTRA/POR, Molecular weight cutoff at 6,000–8,000) against water to remove the small molecular weight electrolytes. The aqueous solution of this purified sample was then dried at 65° C. first in a rotary evaporator under dynamic vacuum, then dried at 70° C. in an oven overnight. The sample is a green-colored solid which contains PAN in the protonated form.

At this point, almost all the "free" or un-complexed species of the sample are removed, and there is no other species that are extractable as long as PAN is in the protonated, green-colored form. It will be shown in the following section that some of the bounded species are strongly bound and some of them are bounded less strongly. The sample obtained in this step can be considered as a complex, as distinguished from a mixture. Although the weakly bound species will be removed by chemical means in the next step of purification, it is instructive to analyze the chemical composition of the molecular complex obtained at this stage. For this purpose, the green colored solid of PSSA-PAN complex was ground into powder and submitted for elemental analysis (M-H-W Laboratories, Phoenix, Ariz.). The elemental analysis data and the chemical formula are listed in Tables 1 and 2 for samples synthesized according to procedures described in Examples 1A and 1B. It can be seen that samples for two batches of syntheses have consistent chemical composition.

TABLE 1

Elemental analysis of two samples in the protonated green state, synthesized by method of Example 1A and purified by removing free cations and free PSSA.

| Sample | % C | % H | % N | % S | % ASH $SO_4^{2-}$ | Empirical Formula |
|---|---|---|---|---|---|---|
| 1 | 50.80 | 5.09 | 2.87 | 11.29 | 3.31 | $(C_8H_7S_{0.94}O_3H)_{1.83}\cdot(C_6H_4NH)_{1.00}\cdot H_{4.94}O_{3.36}\cdot Fe_{0.11}$ |
| 2 | 49.79 | 5.11 | 2.79 | 11.09 | 4.56 | $(C_8H_7S_{0.94}O_3H)_{1.85}\cdot(C_6H_4NH)_{1.00}\cdot H_{5.63}O_{3.86}\cdot Fe_{0.09}$ |

TABLE 2

Elemental analysis of two samples in the protonated green state, synthesized by method of Example 1B and purified by removing free cations and free PSSA.

| Sample | % C | % H | % N | % S | % ASH $SO_4^{2-}$ | Empirical Formula |
|---|---|---|---|---|---|---|
| 3 | 58.13 | 5.29 | 4.43 | 11.22 | NIL | $(C_8H_7S_{0.95}O_3H)_{1.17}\cdot(C_6H_4NH)_{1.00}\cdot H_{2.26}O_{0.65}$ |
| 4 | 58.50 | 6.41 | 4.62 | 11.06 | NIL | $(C_8H_7S_{0.96}O_3H)_{1.09}\cdot(C_6H_4NH)_{1.00}\cdot H_{5.52}O_{0.41}$ |

Samples in Table 1 contains a small amount of un-removed ferric (or ferrous) ions. This may be related to the fact that a much larger amount of ferric ion was used in Example 1A than in Example 1B (90 milimole vs. 0.2 milimole).

Removal of Weakly Bound Pan and Oligomer of Aniline

Samples listed in Tables 1 and 2 do not have extractable "free" species when the sample is maintained in the green-colored, protonated form for PAN. This indicates that the sample is a molecular complex as opposed to a mixture. This "complex", however, contained weakly bound species as revealed by the fact that part of the composition can be extractable when these samples were in their deprotonated, purple colored form due to treatment by excess amount of NaOH. The extractable part of the above "complex" was found to be mostly oligomer and monomers of aniline. There is also a small amount of PSSA that became "free" perhaps resulting from the release of its complexing partners. The details to be described in this section will show that the remaining PAN is of higher molecular weight than that of the released oligomer.

We use the symbol TEMP-PAN-(AN)n-m as a slightly simplified model to represent the complexes of Tables 1 and 2. This symbol expresses that the template PSSA binds with two kinds of anilines: PAN is the high molecular weight conducting polymer and AN is the oligomeric and monomeric aniline. The protonated form of Tables 1 and 2 contains positively charged PAN (due to the formation of polarons and protonated amine groups), and positively charged AN (due to protonation of aniline to form anilinium ions). These positively charged species are attracted to the negatively charged sulfonate ions of PSSA. There may also be some hydrogen-bonding between the components in addition to the electrostatic attractions.

This type of electrostatic attraction is lost when the sample is treated with strong base because both PAN and AN becomes un-charged when treated with strong base. Under this condition AN is being released from the complex to form TEMP-PAN. The fact that the base-treated complex still retains PAN indicates that the binding between PSSA and higher molecular weight PAN is stronger. This may come from some other attractive interaction that are enhanced by the increased corperativity between neighboring monomer units exists in larger molecular weight PAN. Corperativity in polymer complex formation is well known for the formation of alpha-helix in proteins and oligo- and poly- peptide, and in double-strand DNA. The corperativity in binding is stronger for synthetic poly(amino acid) of longer chains [D. Poland and H. A. Scheraga, "Theory of Helix-Coil Transitions in Biopolymers", Academic Press, 1970].

Experimental Details

Figure 9:
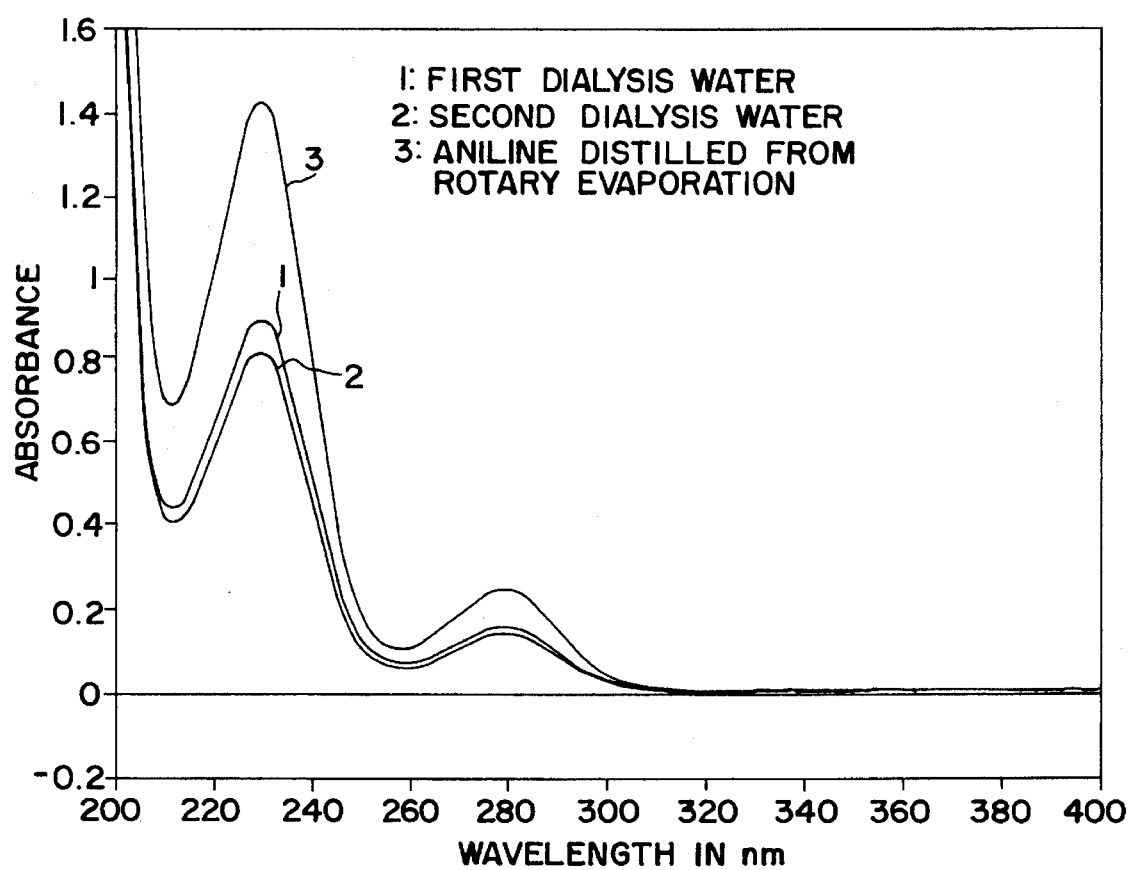
FIG. 9 is a graphical representation showing the UV-spectra of aniline extracted by dialysis and by evaporation of the PSSA-(PAN)-(AN)n-m sample.

Samples (dry powders) of Tables 1 and 2 were dissolved in distilled water to form green-colored solution. An excess amount of 1 N NaOH solution was added to turn the solution into purple-color deprotonated form. As was mentioned in the above, if there were any aniline monomer or low molecular oligomer originally bounded to PSSA will be released upon NaOH treatment. To collect the released aniline (and to remove NaOH) the purple color solution was dialyzed in distilled water. The water was analyzed spectroscopically to quantify the amount of released aniline (see curves 1 and 2 in FIG. 9 for a sample from Example 1B). At the end of dialysis, the purple colored solution in the dialysis tube turned back to blue which is the color of PAN in neutral pH solutions.

The remaining monomeric and oligomeric aniline is separated from the complex by distillation. The blue colored samples (except the sample marked as 1DPB which is purple color because an additional amount of NaOH was added after dialysis) were heated to 65° C. under vacuum in a rotary evaporator until the sample is nearly dried. The weakly bound aniline monomers and were distilled into a trap and the condenser was rinsed with distilled water. This aniline dissolved in water was also spectroscopically analyzed (curve 3 in FIG. 9) to estimate the amount of released aniline.

Sample 1DPB was prepared by treating sample 1 of Table 1 with excess NaOH to obtain purple colored PAN. It was dialyzed with neutral pH water to result in a blue solution. Additional amount of NaOH was added to the blue solution to turn it to purple before evaporation and drying. The dried purple sample contains excess amount of NaOH as reflected by the excess amount of Na in the chemical formula in Table 3.

TABLE 3

Elemental analysis of PSSA-PAN complex after NaOH treatment, dialysis and distillation of samples of Table 1.

| Sample | % C | % H | % N | % S | % ASH $SO_4^{2-}$ | Empirical Formula |
|---|---|---|---|---|---|---|
| 1DPB | 35.87 | 4.39 | 1.94 | 7.88 | 44.44 | $(C_8H_7S_{0.91}O_3Na)_{1.94}:(C_6H_4NH)_{1.00}:Na_{2.48}H_{10.84}O_{10.20}$ |
| 1RP | 48.19 | 3.89 | 2.63 | 10.74 | 16.91 | $(C_8H_7S_{0.93}O_3Na)_{1.27}(C_8H_7S_{0.93}O_3H)_{0.65}:(C_6H_4NH)_{1.00}:H_{1.34}O_{3.93}$ |
| 2DP | 44.41 | 3.99 | 2.39 | 10.25 | 13.91 | $(C_8H_7S_{0.96}O_3Na)_{1.15}(C_8H_7S_{0.96}O_3H)_{0.81}:(C_6H_4NH)_{1.00}:H_{3.61}O_{6.74}$ |
| 2RP | 45.70 | 4.37 | 2.36 | 10.71 | 14.68 | $(C_8H_7S_{0.96}O_3Na)_{1.23}(C_8H_7S_{0.96}O_3H)_{0.83}:(C_6H_4NH)_{1.00}:H_{5.43}O_{3.74}$ |

TABLE 4

Elemental analysis of PSSA-PAN complex after NaOH treatment, dialysis and distillation of samples of Table 2.

| Sample | % C | % H | % N | % S | % ASH $SO_4^{2-}$ | Empirical Formula |
|---|---|---|---|---|---|---|
| 3DP | 42.82 | 3.96 | 0.25 | 12.88 | 15.31 | $(C_8H_7S_{0.93}O_3Na)_{1.21}(C_8H_7S_{0.93}O_3H)_{1.21}:(C_6H_4NH)_{0.10}:H_{3.30}O_{5.04}$ |
| 3RP | 45.73 | 4.70 | 0.23 | 13.46 | 0.90 | $(C_8H_7S_{0.91}O_3H)_{2.82}:(C_6H_4NH)_{0.10}:H_{5.24}O_{5.07}$ |
| 4DP | 42.75 | 4.76 | 0.28 | 12.46 | 25.29 | $(C_8H_7S_{0.91}O_3Na)_{1.75}(C_8H_7S_{0.91}O_3H)_{0.37}:(C_6H_4NH)_{0.10}:H_{7.84}O_{3.40}$ |
| 4RP | 44.36 | 4.77 | 0.23 | 12.87 | 14.07 | $(C_8H_7S_{0.89}O_3Na)_{1.21}(C_8H_7S_{0.89}O_3H)_{1.53}:(C_6H_4NH)_{0.10}:H_{7.52}O_{4.42}$ |

The total amount of released aniline is the sum of the amount released from dialysis and distillation. There was less than 5% loss of aniline from samples of Table 1 and 95% loss of aniline from samples of Table 2. The relatively large amount of loss for sample of Table 2 (prepared in Example 1B) is expected because only 5% (mole percent of the reagent aniline) of hydrogen peroxide was used to react with the aniline monomer therefore only 5% of the material was polymerized, resulting into 95% of unreacted anilinium ion that was bounded to PSSA in Table 2. For samples prepared in Example 1A, there was negligible loss of aniline from the compositions listed in Table 1. This indicates that all of the PAN components of PSSA-PAN in Table 2 is strongly bound to PSSA and the molecular weight of PAN is probably high.

Samples were submitted to elemental analysis (M-H-W Laboratories, Phoenix, Ariz.) and the results are listed in Tables 3 and 4. Samples 1DPB and 1RP were both derived from sample 1 of Table 1. Samples 2DP and 2RP were both derived from sample 2 of Table 1. Samples 3DP and 3RP were derived from sample 3 of table 2. Samples 4DP and 4RP were derived from sample 4 of Table 2. All of the samples labeled as DP were base treated then hydrolyzed, distilled and dried for elemental analysis. All of the samples labeled as RP are derived from the corresponding DP samples by treating the distilled and dried DP samples with 1 M HCl and then re-dialyzed and redistilled before drying for elemental analysis. The results show that the composition of the PSSA-PAN complex is relatively constant once the weakly bound aniline monomer was removed by the first base treatment. This indicates that the PSSA-PAN complex in Tables 3 and 4 are strongly bound complexes.

The above procedure of NaOH treatment leads to PSSA-PAN complex with strong binding between the components as illustrated by the relatively constant composition for extractions performed on samples deprotonated (DP), and reprotonated (RP). The chemical formula of Tables 3 and 4 are consistent with the following general formula for the PSSA-PAN complex:

$(C_8H_7SO_3X)x:(C_6H_4NH)y:(H_2O)z$ 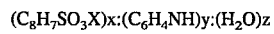

where X is either H or Na depending on the degree of protonation of the samples.

This general empirical formula is consistent with the molecular complex between PSSA and PAN whose monomers have the chemical formula of ($—C_8H_7SO_3H—$) and ($—C_6H_4NH—$) (for the reduced, basic form of PAN) respectively. The chemical formula for PAN of different oxidation and protonation states will have slight variation of the H atom content depending on the degree of doping. The empirical formula is also consistent with having water molecules bounded to the polymer complex (under the mild 70° C. drying of the complex). The amount of water can not be accurately determined because the mentioned uncertainty of the amount of H atoms associated with PAN and the difficulty in handling the somewhat hygroscopic sample.

The elemental analysis data also show that the relative loading of PAN on PSSA template can be controlled by using adjusted amount of the reagents for polymerization. Samples synthesized in Example 1A has an x:y ratio of 2:1, while those synthesized in Example 1B has a ratio of 20:1. In this case the main control is the amount of oxidants available for polymerization.

The reliability of the above mentioned elemental analysis was tested by blind samples that are pure polyaniline and pure PSSA sodium salt. The pure polyaniline in the base form was synthesized and purified by the following procedure:

Synthesis of un-complexed polyaniline:

10 ml of aniline monomer were added into 70 ml of 3M HCl, stirred, formed a homogeneous solution, then added 2.5 ml of 30% hydrogen peroxide and 2.5 ml of 0.1 M FeCl$_3$, polymerized, obtained green polyaniline small particles. The particles are not soluble in water or organic solvents.

Purification of un-complexed polyaniline:

The particulate PAN was washed 3 times with 400 ml of 0.1M HCl solution, then washed with 500 ml of methanol. Filtered with 3 μm pore polycarbonate membrane filter (Poretics corp.). The particles were treated with 28.8% ammonia water, stirred for 6 hr PAN turns into purple and undoped form. Washed with water, methanol and then dried at 70° C.

Elemental analysis of the above purified base form of PAN gives C: 75.38%, H: 5.04%, N: 14.63%, SO$_4$ ash: 0%; which gives a empirical formula of $C_6H_{4.8}N_{1.0}$. The expected formula for the fully reduced polyaniline base is $C_6H_5N$. However, the stable polyaniline can exist in and oxidized form with variable extent of oxidation with increasing number of quinonediimine units. The most oxidized form has the theoretical formula of $C_6H_4N$.

The sample of pure PSSA sodium salt from Polyscience was submitted for elemental analysis to give C: 38.97%, H: 4.16%, S: 13.94, Na$_2$SO$_4$ ash: 37.86%; which gives an empirical formula of $C_8H_{9.54}S_{1.05}O_{3.84}Na_{0.70}$. This is consistent with a theoretical formula of $C_8H_7S_1O_3Na_1*(H_2O)x$.

These tests of elemental analysis on pure PAN and PSSA sodium salt indicates that the elemental analyses of the PSSA-PAN molecular complex mentioned in the previous sections are reliable.

The PAN portion of the molecular complex PSSA-PAN described in the above consist several segments of polyaniline molecules all bound to PSSA. Polymerization of AN starts at several nucleation sites of the TEMP-(AN)n complex, and the resulting PAN has a distribution of chain length. By adjusting the reaction condition the molecular weight distribution of the PAN portion of the complex may be adjusted. Example 1A gives about 1:2 ratio of PAN:PSSA in the complex, otherwise, Example 1B gives about 1:20 ratio of PAN:PSSA in the complex. It is believed that a lower average molecular weight of PAN may make PSSA-PAN complex more soluble in water due to more uncomplexed sulfonic group on the backbone of the complex, while higher average molecular weight leads to the formation colloid or insoluble solid due to the decrease of sulfonic group.

Example 2

Molecular complex of Poly(2-acrylamido-2-methyl-1-propenesulfonic acid) and polyaniline (PAMPSA-PAN)

PAMPSA-PAN was synthesized by adding 3.5 ml of aniline into 80 gram of poly(AMPSA) (10% aqueous solution, Aldrich) and stir for 30 minutes. To this solution is added 10 ml of 2 M sulfuric acid, 1.5 ml of 30% hydrogen peroxide and 1 ml of 0.1M ferric chloride. Solution turns green due to polymerization of aniline. After 3 hours of reaction at room temperature, the reaction product is filtered (Millipore, 1.2 μm pore size). Filtrate is a clear green solution. Free poly(AMPSA) was removed by extraction and the aniline oligomer, low molecular weight ions were removed by repeated dialysis. The purified solution was dried by rotary evaporation and by overnight drying in oven at 70° C. The powder obtained is soluble in water, methanol, ethanol, DMSO, and other polar solvents. Thin film casted from solution onto Formvar substrate was examined transmission electron microscopy. The film appears to be homogeneous and featureless up to 100 K fold magnification.

A Colloidal Suspension of the Molecular Complex

Example 3

Molecular complex of poly(acrylic acid) and polyaniline. (PAA-PAN)

Synthesis

Commercial poly(acrylic acid) 25 ml (Aldrich, Co. M.W.=90,000, 25 wt. % solution in water) was dissolved in 200 ml of tetrahydrofuran (THF) to provide a homogenous clear solution. To this solution was added excess freshly distilled aniline, and vigorously stirred to give a gel composed of a molecular complex of aniline and poly(acrylic acid). The gel complex was washed twice with 30 ml of THF to remove the excess aniline and redissolved in 200 ml of 1M HCl, also to afford a clear solution. Then, 1 ml of 30% hydrogen peroxide and 5 ml of 5% ferric chloride were added to the reaction mixture. Stirred 1 hour, the reaction mixture turned dark green color with a slight turbidity. A small amount of particulate matter was removed by filtering with quantitative grade filter paper (Fisher Scientific, Fisherbrand Cat. No. 09-790-2A, particle retention 2 to 5 μm) to provide an almost clear, dark green solution.

Figure 10:
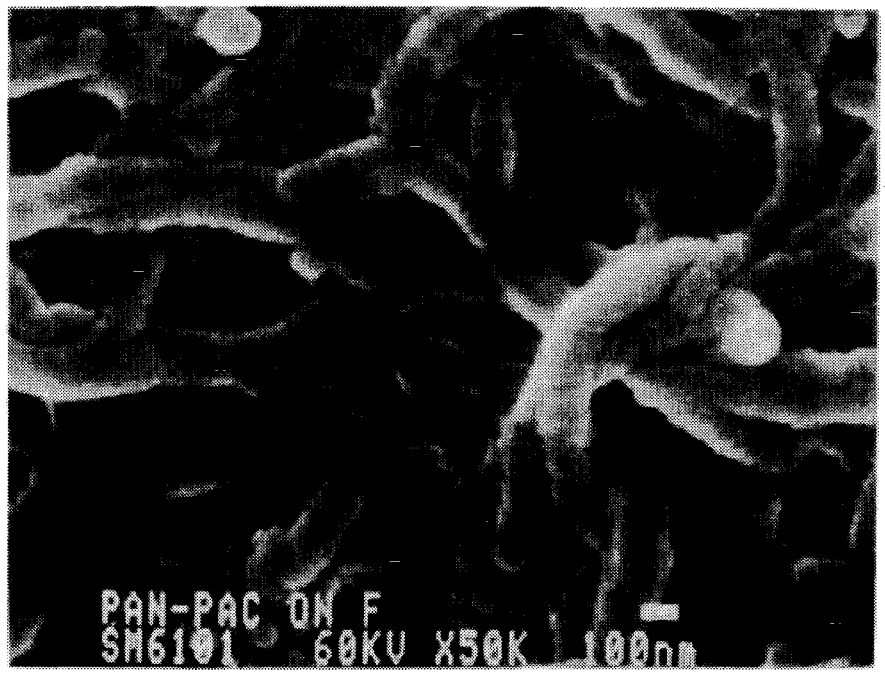
FIG. 10 is a SEM picture showing long fibrils PAA-PAN with diameter about 50 nm and length between 2 to 5 μm.
Figure 11:
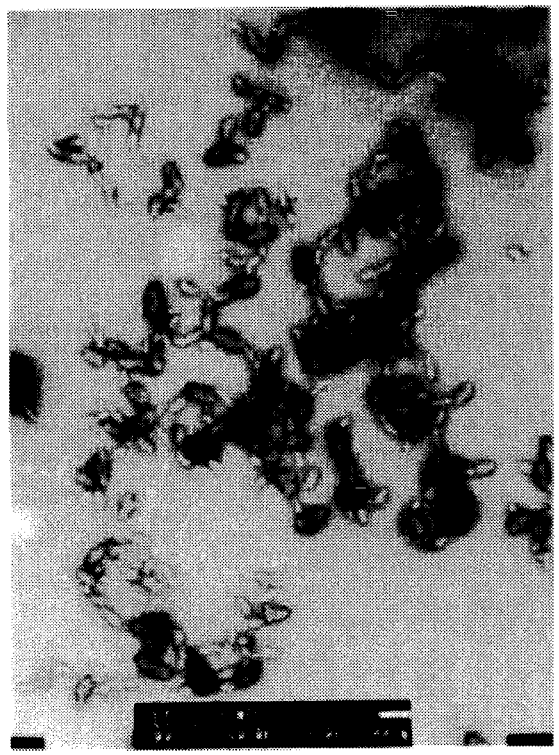
FIG. 11 is a TEM picture showing the colloidal particles of PAA-PAN.

The apparently clear solution actually contained a colloidal suspension of two different sizes of fibrils. FIG. 10 shows a scanning electron micrograph (SEM) of long fibrils with diameter about 50 nm (excluded sputter coating thickness) and length between 2 to 5 μm. These fibrils were captured by refiltering with 5 μm polycarbonate membrane filter (Poretics, Co. Cat. No. 13068). The filtrate is a clear dark green colloidal suspension containing smaller fibrils about 50 nm in diameter and 100 to 200 nm in length as shown in FIG. 11; this transmission electron micrograph (TEM) was obtained by using 1% ammonium molybdate in 2% sodium acetate as staining solution. It is interesting to note that the diameter of the small fibrils is about the same as that for the long fibrils mentioned in the above, and the small fibrils are remarkably uniform in shape. This indicates the formation of TEMP-(An)n complex is very homogeneous and uniform.

The clear dark green solution can change color by oxidation-reduction or by acid-base reactions. It was diluted to make sure the absorbance is below 3.00, then titrated with tin(II) chloride, ceric ammonium sulfate, and sodium hydroxide. Some representative in situ spectra were shown in FIGS. 12 and 13, the rest potential (R.P.) and pH value for each spectrum were listed in Table 1. The spectra shown in FIG. 12 are not significantly different from those for electrochemically synthesized polyaniline films [P. M. McManus, R. J. Cushman and S. C. Yang, *J. Phys. Chem.*, 91, 744 (1987); R. J. Cushman, P. M. McManus and S. C. Yang, *J. Electroanal. Chem.*, 291, 335 (1986)] at the corresponding pH and electrochemical potential. The initial diluted reaction mixture was measured R.P.=+0.445 and pH=2.169, and taken the spectrum 1. When more and more reductant was added to the initial diluted reaction mixture, the absorbance at 320 nm increased and the 800 nm band decreased to flat level (spectrum #6) which indicated that the complex fibrils were close to the fully reduced leuco form. When ceric ammonium sulfate was added dropwise to the initial reaction mixture, the 800 nm band is blue shifted towards 610 nm in the sequence of spectra 7 to 10, and there is a concurrent increase of absorbance at 330 nm. This indicates that the colloidal green conductor can be chemically oxidized to yield colloidal blue insulator in the aqueous solution.

FIG. 13 shows the spectra that result from base titration. The absorbance changed very little during the initial stage of titration when free HCl or the excess carboxylic group in solution were being neutralized. As more base was added to reach pH 10.9, the R.P. changed to −0.039 (spectrum #15), and the color turned to blue consistent with the previously reported pH-potential phase diagram [R. J. Cushman et al, *J. Electroanal. Chem.*, 291 335 (1986)]. It should be noted that the short fibrils can undergo transformation to all accessible forms of polyaniline and they stay as colloidal suspension in aqueous solution under a wide range of pH and oxidation states. However, the colloidal suspension eventually precipitates by adding strong oxidant. When 1 ml ceric ammonium sulfate was added to the base-treated reaction mixture (spectrum #17) the short complex fibrils begin to precipitate. This indicates that the complex fibrils are less stable in the fully oxidized form than in the fully reduced leuco form. The stability of the polyaniline-polyacid complex seems to be established by the attractive force between the secondary amine of polyaniline and the carboxylic group of poly-(acrylic acid) within the fibrils.

Purification

Other batches of reaction mixture were purified for the purpose of performing elemental analysis. The colloidal particles were sedimented by ultracentrifuge at 10,000 rpm (acceleration force=12,000 times gravity). The solution above the sediment was removed and the pH of this relatively clear solution was measured. The sediment was washed with water and then again subjected to ultracentrifuge separation. Such cycles were repeated for 4 times. The pH value of the upper layer of solution was found to rise from pH 1 for the solution from the first cycle to pH 6–7 for the 4th cycle. The rise in pH is an indication of the near-complete removal of free PAA or other acid. The sediment from the 4th cycle was washed with methanol and dried by rotary evaporator followed by oven drying at 70° C. Elemental analysis:

The purified and dried samples were sent to M-H-W Laboratories (Phoenix, Ariz.) for elemental analysis. The results were shown on Table 5.

Properties of PAA-PAN Molecular Complex

The apparently clear solution actually contained a colloidal suspension of two different sizes of fibrils. FIG. 10 shows a scanning electron micrograph (SEM) of long fibrils with diameter about 50 nm (excluded sputter coating thickness) and length between 2 to 5 μm. These fibrils were captured by refiltering with 5 μm polycarbonate membrane filter (Poretics, Co. Cat. No. 13068). The filtrate is a clear dark green colloidal suspension containing smaller fibrils about 50 nm in diameter and 100 to 200 nm in length as shown in FIG. 11; this transmission electron micrograph (TEM) was obtained by using 1% ammonium molybdate in 2% sodium acetate as staining solution. It is interesting to note that the diameter of the small fibrils is about the same as that for the long fibrils mentioned in the above, and the small fibrils are remarkably uniform in shape.

The clear dark green solution can change color by oxidation-reduction or by acid-base reactions. It was diluted to make sure the absorbance is below 3.00, then titrated with tin(II) chloride, ceric ammonium sulfate, and sodium hydroxide. Some representative in situ spectra were shown in FIG. 12 and 13, the rest potential (R.P.) and pH value for each spectrum were listed in Table 6. The spectra shown in FIG. 12 are not significantly different from those for electrochemically synthesized polyaniline films at the corresponding pH and electrochemical potential. The initial diluted reaction mixture was measured R.P.=+0.445 and pH=2.169, and taken the spectrum 1. When more and more reductant was added to the initial diluted reaction mixture, the absorbance at 320 nm increased and the 800 nm band decreased to flat level (spectrum #6) which indicated that the complex fibrils were close to the fully reduced leuco form. When ceric ammonium sulfate was added dropwise to the initial reaction mixture, the 800 nm band is blue shifted towards 610 nm in the sequence of spectra 7 to 10, and there is a concurrent increase of absorbance at 330 nm. This indicates that the colloidal green conductor can be chemically oxidized to yield colloidal blue insulator in the aqueous solution.

FIG. 13 shows the spectra that result from base titration. The absorbance changed very little during the initial stage of titration when free HCl or the excess carboxylic group in solution were being neutralized. As more base was added to reach pH 10.9, the R.P. changed to −0.039 (spectrum #15), and the color turned to blue consistent with the previously

TABLE 5

Elemental analysis results of PAA-PAN complex

| Sample | % C | % H | % N | % Cl | % ASH SO | Empirical Formula |
|---|---|---|---|---|---|---|
| 1 | 57.93% | 5.53% | 6.79% | 3.01% | 1.64% | $(C_3H_3CO_2H)_{1.3}:(C_6H_4NH)_{1.0}:H_{1.04}O_{0.76}$ |
| 2 | 58.18% | 5.60% | 6.58% | 3.04% | 2.64% | $(C_3H_3CO_2H)_{1.4}:(C_6H_4NH)_{1.0}:H_{1.07}O_{0.56}$ |

From Table 5, one can also conclude that the PAA-PAN molecular complex has the general chemical formula of $$(C_3H_3CO_2H)x:(C_6H_4NH)_{1.0}:(H_2O)y$$

This general empirical formula is consistent with the molecular complex between PAA and PAN whose monomers have the chemical formula of (—$C_3H_3CO_2H$—) and (—$C_6H_4NH$—) (for the reduced, basic form of PAN) respectively.

reported pH-potential phase diagram [R. J. Cushman et al, *J. Electroanal. Chem.*, 291 335 (1986)]. It should be noted that the short fibrils can undergo transformation to all accessible forms of polyaniline and they stay as colloidal suspension in aqueous solution under a wide range of pH and oxidation states. However, the colloidal suspension eventually precipitates by adding strong oxidant. When 1 ml ceric ammonium sulfate was added to the base-treated reaction mixture (spectrum #17) the short complex fibrils begin to precipitate. This indicates that the complex fibrils are less stable in the fully oxidized form than in the fully reduced leuco form. The stability of the polyaniline-polyacid complex seems to be established by the attractive force between the secondary amine of polyaniline and the carboxylic group of poly(acrylic acid) within the fibrils.

Example 4

Colloidal particle of Poly(styrenesulfonic acid)-poly(m-chloroaniline). PSSA-(Cl-PAN).

A solution of 3 ml of 30% poly(styrene-sulfonic acid) (Polysciences, M.W.=70,000) and 1.2 ml of m-chloroaniline was added 50 ml of 1M HCl. Then, 1 ml of 30% hydrogen peroxide and 5 ml of 5% ferric chloride were added to the reaction mixture. Stirred for 1 hour, the reaction mixture turned dark green color.

The dark green solution was dried on a sample holding grid for transmission electron microscope (TEM). The colloids were examined under TEM (without staining) and globular particles of about 100 nm diameter. X-ray microanalyses were performed during the TEM measurements and the S to Cl ratio was found to be approximately 1:1. FIG. 14 shows an example of the X-ray microanalysis.

A Conducting Polymer with Fibrous Morphology

PAA-PAN as an example.

Figure 1A:
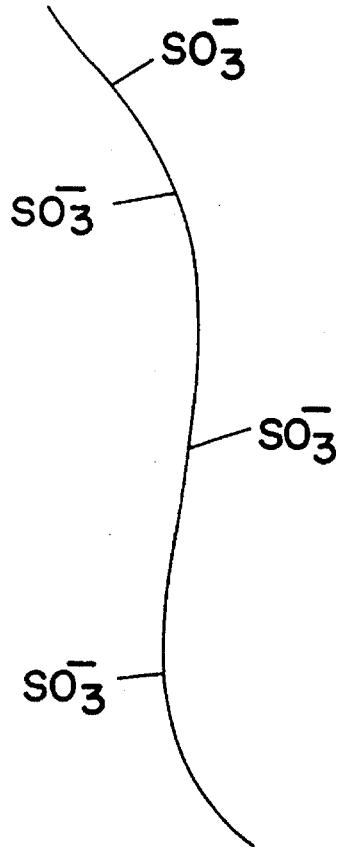
FIG. 1(a) is a schematic illustration showing chemically substituted conducting polymer. In this example, a sulfonate functional group is covalently bonded to the backbone of the conducting polymer.
Figure 1B:
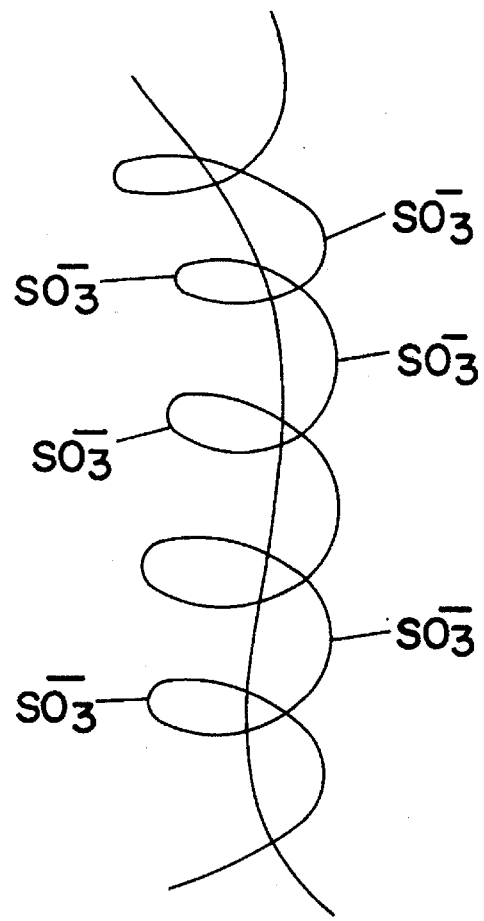
FIG. 1(b) is a schematic illustration showing molecular complex which consists a conducting polymer (the curve line) and a polyelectrolyte (the coil) which is functionalized to render solubility.
Figure 2:
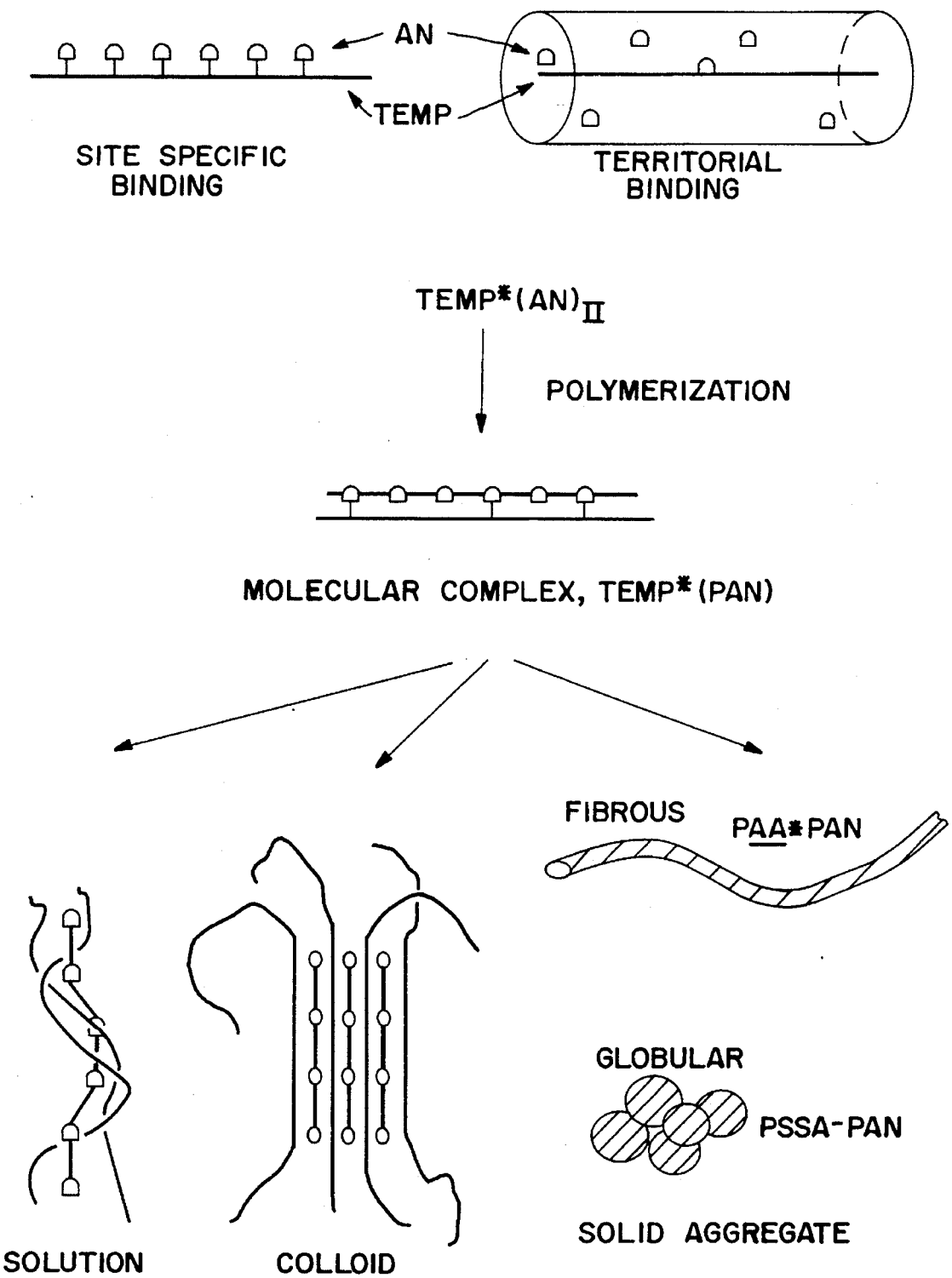
FIG. 2 are schematics of template-guided synthesis of conducting polymers.

For some applications such as stretch processing and melt processing, and for compounding a fibrous solid material has its advantages. One strategy for forming fibrous material is to increasing the loading of AN onto TEMP of FIG. 1.

Example 5

Two phase synthesis of PAA-PAN

Two phase method. Typical procedure for preparation of higher aniline content template complex: commercial poly(acrylic acid) 25 ml (Aldrich, Co. M.W.=90,000. 25 Wt. % solution in water) was dissolved in 100 ml of 3M HCl aqueous solution. To the mixture was added 1 ml of 30% $H_2O_2$ and 3 ml of 5% $FeCl_3$, then a solution of 3 ml of aniline in 25 ml of toluene was added. the reaction was vigorously stirred for 4 hrs to provide dark green precipitate. After washed with 400 ml of water by stirring for 24 hr, the solid was filtered, then extruded through a syringe to get fiber-type complex. FIG. 15 shows the fibrous morphology of the material.

In this example the polymerization takes place in the aqueous phase while the organic phase serves as a reservoir that stores the monomer reactant. During the reaction the concentration of the monomer in the aqueous phase in maintained at low, and relatively constant concentration due to the partition between the organic and the aqueous phases. Under this condition, the oligomer of aniline (attached to TEMP) plays an important role because it exists as a reactive radical that allows for addition of monomer units to extend its chain length. The number of nucleation sites is kept low due to the reactivity of the radical oligomer and the low concentration of monomer in the aqueous phase.

This principle can be demonstrated in a related synthesis. We used the green colloid solution containing short fibrils of FIG. 11 and oxidants as the starting solution (long fibers were removed by 5 um filter), an aliquot of organic phase containing aniline dissolved in toluene was added to it while stirring vigorously. The product consists mainly of long fibers that do not pass through 5 μm filters, and the filtrate is colorless as opposed to the dark green starting solution, indicating that all of the small particles we converted into long fibers. This experiment provides further support to the idea that the oligomeric radical cation can be used to bind to a template and to complete the chemical polymerization before its chemical decay.

Molecular Template of Higher Molecular Weight

For certain applications it is desirable to make the molecular complex of longer chain length, and to make longer fibers that are advantageous for stretch processing. Such material may have higher electrical conductivity and anisotropic optical property. One strategy is to use molecular templates of higher molecular weight.

EXAMPLE 6

M.W.=250,000 Poly(acrylic acid) as a template polymer.

Higher M.W. poly(acrylic acid) is difficult to dissolve in acid solution and also difficult in THF solution. So, it is not easy to obtain homogeneous TEMP-(AN)n of anilinium ion and poly(acrylic acid). In order to provide the anilinium/polyacid molecular complex homogeneously, we treated the poly(acrylic acid) with 1N NaOH aqueous solution to give a clear solution. This gives polyacrylates of extended chain because the coulombic repulsion of the charges on this highly ionized polyanion. Then excess aniline monomer was added and stirred vigorously. At this point the reaction mixture is an oily emulsion that contains aniline-rich oil droplets. The aniline monomers were transferred from the oil droplet to the aqueous medium by slowly controlled addition of 3M HCl aqueous solution to reach the neutralization point. After the neutralization point, the reaction mixture starts to form gel while the 3M HCl solution was added dropwise continuously. The gel was redissolved into 1M HCl solution and added $H_2O_2$, $FeCl_3$ to polymerize aniline in TEMP-(AN)n and afford the dark green precipitate. Those precipitates were washed with water for 24 hours to remove the free polyacid and then filtered to provide a flexible sheet that indicates the higher molecular M.W. property. The SEM picture was shown in the FIG. 16 which has the similar morphology with the FIG. 16. The conductivity measured with four probe method was about $1\times10^{-1}$ S $cm^{-1}$. The conductivity was increased by 10 times than that 90,000 M.W. template polymer was used in the two phase method. This indicates that we has succeeded in the morphology control but minimize perturbation on the electronic structure.

Example 7

M.W.=750,000 Poly(acrylic acid) as a template polymer.

The synthetic procedure is similar to Example 6 except that the template poly(acrylic acid) used is of higher molecular weight (M.W.=750,000). The reaction product is a colloid that is readily sedimented. FIG. 17 is a TEM picture of a colloidal particle. Long fibers were formed due to the use of high molecular weight template. This material may have advantage for stretch processing.

Example 8

Poly(butadiene-maleic acid)-Polyaniline.

Poly(butadiene-maleic acid) 10 g of 42% aqueous solution from Polysciences Inc. was diluted with 20 ml of distilled water. To this solution is added 2 ml of aniline while continuously stirred to obtain a white gel. Put this white gel into a solution made by mixing 20 ml of 3 M HCl, 1 ml of 10% hydrogen peroxide and 1 ml of 0.1 M $FeCl_3$. Stirred at room temperature for 1 hour to obtain a green sticky elastic gel. This gel contains a complex of poly(butadiene-maleic acid) and polyaniline. This is an example of using a copolymer as a template to form a family of molecular complexes with modified properties.

By choosing different copolymer templates the material properties can be adjusted. The complex may have different solubility, glass transition temperature, and compatibility properties that can be adjusted for specific applications.

The specific complex of poly(butadiene-maleic acid) and polyaniline has the interesting property of being highly stretchable to form long fibers. The green colored gel obtained in this example was drawn into long fibers while the solvent is evaporated at room temperature. These fibers are flexible and show electrical conductivity.

Example 9

Mixed template polymers.

30 g of poly(acrylic acid) (Aldrich, M.W.=90,000 25% in water) and 30 g of poly(stryenesulfonic acid) (Polyscience co. M.W.=70,000) were dissolved in 200 ml of THF to obtain a clear solution. The excess freshly distilled aniline was added to provide a gel, then the THF solution was decanted and the gel was washed with 30 ml of THF twice. The gel was redissolved into 1 N HCl aqueous solution and 3 ml of 30% $H_2O_2$, 1 ml of 5% $FeCl_3$ were added. The reaction mixture was stirred at room temperature for 1 hour to provide a green color colloidal suspension. The reaction product contains a molecular complex of two kinds of polyacid and polyaniline.

TABLE 6

Rest potential (R.P.) vs. SCE and pH for spectra in FIGS. 12 and 13

| Spectrum | RP/V | pH |
|---|---|---|
| 1 | 0.445 | 2.169 |
| 2 | 0.259 | 1.606 |
| 3 | 0.244 | 1.240 |
| 4 | 0.152 | 0.955 |
| 5 | 0.014 | −0.011 |
| 6 | 0.041 | −0.844 |
| 7 | 0.463 | 1.989 |
| 8 | 0.472 | 1.964 |
| 9 | 0.481 | 1.950 |
| 10 | 0.481 | 1.933 |
| 11 | 0.392 | 2.257 |
| 12 | 0.372 | 2.743 |
| 13 | 0.332 | 3.484 |
| 14 | 0.209 | 6.627 |
| 15 | −0.039 | 10.911 |
| 16 | −0.060 | 11.370 |
| 17 | −0.070 | 11.507 |

We claim:

1. A processable electrically conductive molecular complex made by a template-guided chemical polymerization process, the molecular complex comprising a polymeric polyelectrolyte and a conductive polymer selected from the group consisting of polyaniline, polypyrrole, polythiophene, poly(phenylene sulfide) and substitutions thereof, said template-guided chemical polymerization process comprises the addition of conducting monomers to an aqueous or non-aqueous solution of a polyelectrolyte to form a monomer/polyelectrolyte solution, followed by the subsequent addition of an oxidant to the monomer/polyelectrolyte solution to polymerize the monomer to form a molecular complex comprising a polyelectrolyte and a conducting polymer wherein the ratio of the conducting polymer to the polyelectrolyte is in the range of 1:1 to 20:1.

2. The molecular complex according to claim 1 wherein said polyelectrolyte is a polymer with anionic functional group selected from the groups consisting of carboxylic acid, sulfonic acid, phosphoric acid, boric acid.

3. The molecular complex according to claim 1 wherein said polyelectrolyte is selected from the group consisting of poly(styrenesulfonic acid), poly(acrylic acid), poly(methacrylic acid), poly(2-acryamido-2-methyl-1-propenesulfonic acid), poly(butadiene-maleic acid, salt forms thereof and copolymers thereof.

4. The molecular complex according to claim 1 wherein said polyelectrolyte is respectively poly(styrenesulfonic acid) and said conducting polymer is polyaniline.

5. The molecular complex according to claim 1 wherein said polyelectrolyte is respectively poly(2-acrylamido-2-methyl-1-propenesulfonic acid) and said conducting polymer is polyaniline.

6. The molecular complex according to claim 1 wherein said polyelectrolyte is respectively poly(acrylic acid) and said conducting polymer is polyaniline.

7. The molecular complex according to claim 1 wherein said polyelectrolyte is poly(butadiene-maleic acid) and said conducting polymer is polyaniline.

8. The molecular complex according to claim 1 wherein said polyelectrolyte is poly(styrenesulfonic acid) and said conducting polymer is polypyrrole.

9. The molecular complex according to claim 1 wherein said polyelectrolyte is poly(acrylic acid) and said conducting polymer is polypyrrole.

10. A processable, electrically conductive molecular complex made by a template guided polymerization process, the molecular complex comprising at least two polymeric polyelectrolytes and a conductive polymer, said process comprising the addition of monomers to an aqueous or non-aqueous solution of at least two polyelectrolytes selected from the group consisting of poly(styrenesulfonic acid), poly(crylic acid), poly(methacrylic acid), poly(2-acryamido-2-methyl-1-propenesulfonic acid), poly(butadiene-maleic acid) and one type of conducting polymer is selected from the group consisting of polyaniline, polypyrrole, polythiophene, poly(phenylenesulfide) and substituted versions thereof to form a monomer/polyelectrolyte/polyelectrolyte solution followed by the addition of an oxidant to the monomer/polyelectrolyte/polyelectrolyte solution to polymerize the monomer to form a molecular complex comprising at least two polymeric polyelectrolytes and a conductive polymer wherein the ratio of the conductive polymer to the polyelectrolyte is in the range of 1:1 to 20:1.

11. The molecular complex according to claim 10 wherein said two types of polyelectrolyte are poly(acrylic acid) and poly(styrenesulfonic acid) and said conducting polymer is polyaniline.

12. The molecular complex according to claim 10 wherein said two types of polyelectrolyte are poly(acrylic acid) and poly(2-acrylamido-2-methyl-1-propenesulfonic acid) and said conducting polymer is polyaniline.

13. The molecular complex according to claim 10 wherein said two types of polyelectrolyte are poly(butadiene-maleic acid) and poly(styrenesulfonic acid) and said conducting polymer is polyaniline.

\* \* \* \* \*

UNITED STATES PATENT AND TRADEMARK OFFICE
CERTIFICATE OF CORRECTION

PATENT NO. : 5,489,400
DATED : Feb. 6, 1996
INVENTOR(S) : Jia M. Liu; Linfeng Sun; Sze C. Yang It is certified that error appears in the above-indentified patent and that said Letters Patent is hereby corrected as shown below:

Column 24, line 3, cancel "20:1" and insert therefor -- 1:20 --

Column 24, line 50, cancel "20:1" and insert therefor -- 1:20 --

Signed and Sealed this

Twenty-second Day of April, 1997

*Attest:*

BRUCE LEHMAN

*Commissioner of Patents and Trademarks*

*Attesting Officer*